United States Patent
Marvasti et al.

(10) Patent No.: US 9,948,528 B2
(45) Date of Patent: Apr. 17, 2018

(54) METHODS AND SYSTEMS TO MANAGE BIG DATA IN CLOUD-COMPUTING INFRASTRUCTURES

(71) Applicant: VMware, Inc., Palo Alto, CA (US)

(72) Inventors: Mazda A. Marvasti, Coto de Caza, CA (US); Ashot Nshan Harutyunyan, Yerevan (AM); Naira Movses Grigoryan, Yerevan (AM); Arnak Poghosyan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 203 days.

(21) Appl. No.: 14/701,066

(22) Filed: Apr. 30, 2015

(65) Prior Publication Data
US 2016/0323157 A1    Nov. 3, 2016

(51) Int. Cl.
H04L 12/26 (2006.01)
H04L 29/08 (2006.01)
G06F 11/34 (2006.01)

(52) U.S. Cl.
CPC ........... *H04L 43/04* (2013.01); *G06F 11/34* (2013.01); *H04L 43/08* (2013.01); *H04L 67/1097* (2013.01)

(58) Field of Classification Search
CPC ..... H04L 43/04; H04L 43/08; H04L 67/1097; G06F 11/34
See application file for complete search history.

(56) References Cited

U.S. PATENT DOCUMENTS

| | | | | |
|---|---|---|---|---|
| 9,466,031 B1* | 10/2016 | Harutyunyan | ....... | G06N 99/005 |
| 2008/0270071 A1* | 10/2008 | Marvasti | ............ | G05B 23/0221 |
| | | | | 702/179 |
| 2010/0088265 A1* | 4/2010 | Pohl | ....................... | G06Q 30/02 |
| | | | | 706/46 |
| 2013/0343213 A1* | 12/2013 | Reynolds | .............. | H04L 43/045 |
| | | | | 370/252 |
| 2014/0198750 A1* | 7/2014 | Prasad | ................. | H04B 7/0626 |
| | | | | 370/329 |
| 2014/0198751 A1* | 7/2014 | Prasad | ................. | H04B 7/0452 |
| | | | | 370/329 |
| 2014/0280894 A1* | 9/2014 | Reynolds | ............ | H04L 43/0876 |
| | | | | 709/224 |
| 2014/0298098 A1* | 10/2014 | Poghosyan | ......... | G06F 11/3452 |
| | | | | 714/37 |
| 2016/0217022 A1* | 7/2016 | Velipasaoglu | ........ | G06F 11/079 |

* cited by examiner

Primary Examiner — Kostas Katsikis

(57) ABSTRACT

Methods and systems that manage large volumes of metric data generation by cloud-computing infrastructures are described. The cloud-computing infrastructure generates sets of metric data, each set of metric data may represent usage or performance of an application or application module run by the cloud-computing infrastructure or may represent use or performance of cloud-computing resources used by the applications. The metric data management methods and systems are composed of separate modules that perform sequential application of metric data reduction techniques on different levels of data abstraction in order to reduce volume of metric data collected. In particular, the modules determine normalcy bounds, delete highly correlated metric data, and delete metric data with highly correlated normalcy bound violations.

24 Claims, 24 Drawing Sheets

$$\begin{bmatrix} \operatorname{corr}(x^{(1)},x^{(1)}) & \operatorname{corr}(x^{(1)},x^{(2)}) & \operatorname{corr}(x^{(1)},x^{(3)}) & \cdots & \operatorname{corr}(x^{(1)},x^{(N)}) \\ \operatorname{corr}(x^{(2)},x^{(1)}) & \operatorname{corr}(x^{(2)},x^{(2)}) & \operatorname{corr}(x^{(2)},x^{(3)}) & \cdots & \operatorname{corr}(x^{(2)},x^{(N)}) \\ \operatorname{corr}(x^{(3)},x^{(1)}) & \operatorname{corr}(x^{(3)},x^{(2)}) & \operatorname{corr}(x^{(3)},x^{(3)}) & \cdots & \operatorname{corr}(x^{(3)},x^{(N)}) \\ \vdots & \vdots & \vdots & & \vdots \\ \operatorname{corr}(x^{(N)},x^{(1)}) & \operatorname{corr}(x^{(N)},x^{(2)}) & \operatorname{corr}(x^{(N)},x^{(3)}) & \cdots & \operatorname{corr}(x^{(N)},x^{(N)}) \end{bmatrix}$$

FIG. 6

$$\begin{bmatrix} C_1 & C_2 & \cdots & C_N \end{bmatrix} = QR = \begin{bmatrix} Q_1 & Q_2 & \cdots & Q_N \end{bmatrix} \begin{bmatrix} r_{11} & r_{12} & r_{13} & \cdots & r_{1N} \\ 0 & r_{22} & r_{23} & \cdots & r_{2N} \\ 0 & 0 & r_{33} & \cdots & r_{3N} \\ \vdots & \vdots & \vdots & & \vdots \\ 0 & 0 & 0 & \cdots & r_{NN} \end{bmatrix}$$

FIG. 7

$$\begin{bmatrix} \text{corr}(a^{(1)},a^{(1)}) & \text{corr}(a^{(1)},a^{(2)}) & \text{corr}(a^{(1)},a^{(3)}) & \cdots & \text{corr}(a^{(1)},a^{(N)}) \\ \text{corr}(a^{(2)},a^{(1)}) & \text{corr}(a^{(2)},a^{(2)}) & \text{corr}(a^{(2)},a^{(3)}) & \cdots & \text{corr}(a^{(2)},a^{(N)}) \\ \text{corr}(a^{(3)},a^{(1)}) & \text{corr}(a^{(3)},a^{(2)}) & \text{corr}(a^{(3)},a^{(3)}) & \cdots & \text{corr}(a^{(3)},a^{(N)}) \\ \vdots & \vdots & \vdots & & \vdots \\ \text{corr}(a^{(N)},a^{(1)}) & \text{corr}(a^{(N)},a^{(2)}) & \text{corr}(a^{(N)},a^{(3)}) & \cdots & \text{corr}(a^{(N)},a^{(N)}) \end{bmatrix}$$

FIG. 21

$$\begin{bmatrix} A_1 & A_2 & \cdots & A_N \end{bmatrix} = QR = \begin{bmatrix} \hat{Q}_1 & \hat{Q}_2 & \cdots & \hat{Q}_N \end{bmatrix} \begin{bmatrix} \hat{r}_{11} & \hat{r}_{12} & \hat{r}_{13} & \cdots & \hat{r}_{1N} \\ 0 & \hat{r}_{22} & \hat{r}_{23} & \cdots & \hat{r}_{2N} \\ 0 & 0 & \hat{r}_{33} & \cdots & \hat{r}_{3N} \\ \vdots & \vdots & \vdots & & \vdots \\ 0 & 0 & 0 & \cdots & \hat{r}_{NN} \end{bmatrix}$$

FIG. 22

METHODS AND SYSTEMS TO MANAGE BIG DATA IN CLOUD-COMPUTING INFRASTRUCTURES

TECHNICAL FIELD

The present disclosure is directed to data analyzing systems to manage large amounts of metric data generated by cloud-computing infrastructures.

BACKGROUND

In recent years, enterprises have shifted much of their computing needs from enterprise owned and operated computer systems to cloud-computing providers. Cloud-computing providers charge enterprises to store and run their applications in a cloud-computing infrastructure and allow enterprises to purchase other computing services in much the same way utility customers purchase a service from a public utility. A cloud-computing infrastructure may be consolidated into a single data center or distributed geographically over numerous data centers, each data center composed of numerous racks of servers, switches, routers, and mass data-storage devices interconnected by local-area networks, wide-area networks, and wireless communications.

IT managers of cloud-computing infrastructures rely on cloud-computing-management systems to generate reliable and accurate information regarding any current abnormalities and identify bottlenecks associated with running each enterprise's applications, and promptly generate actionable recommendations to handle the abnormalities. In an effort to generate reliable and accurate information that may be used to identify current abnormalities, modem cloud-computing infrastructures now generate and store millions of different types of metrics over time that may be referred to as "big data." Each metric may be a measure of a different aspect of running an enterprise's application in a cloud-computing infrastructure. For example, one metric may measure the number of users of an application, another metric may measure the response time of the application, while other metrics may each measure how much certain cloud-computing resources are used by the application. Abnormalities are typically identified when a metric violates a threshold. However, because of an ever increasing volume of metric data that is generated and stored over time, efforts to identify and isolate abnormalities in these large volumes of metric data is becoming increasingly more challenging. IT managers seek methods and systems to manage these increasing volumes of metric data.

SUMMARY

Methods and systems that manage large volumes of metric data generation by cloud-computing infrastructures are described. The cloud-computing infrastructure generates sets of metric data, each set of metric data may represent usage or performance of an application or application module run by the cloud-computing infrastructure or may represent use or performance of cloud-computing resources used by the applications. The metric data management methods and systems are composed of separate modules that perform sequential application of metric data reduction techniques on different levels of data abstraction in order to reduce volume of metric data collected. In particular, the modules determine normalcy bounds, delete highly correlated metric data, and delete metric data with highly correlated normalcy bound violations.

DESCRIPTION OF THE DRAWINGS

FIG. 6 shows an example a correlation matrix of N sets of metric data.

FIG. 7 shows Q and R matrices of the correlation matrix shown in FIG. 6.

FIG. 21 shows an example of a correlation matrix of a set of anomaly metric data.

FIG. 22 Q and R matrices of the correlation matrix shown in FIG. 21.

DETAILED DESCRIPTION

Figure 1:
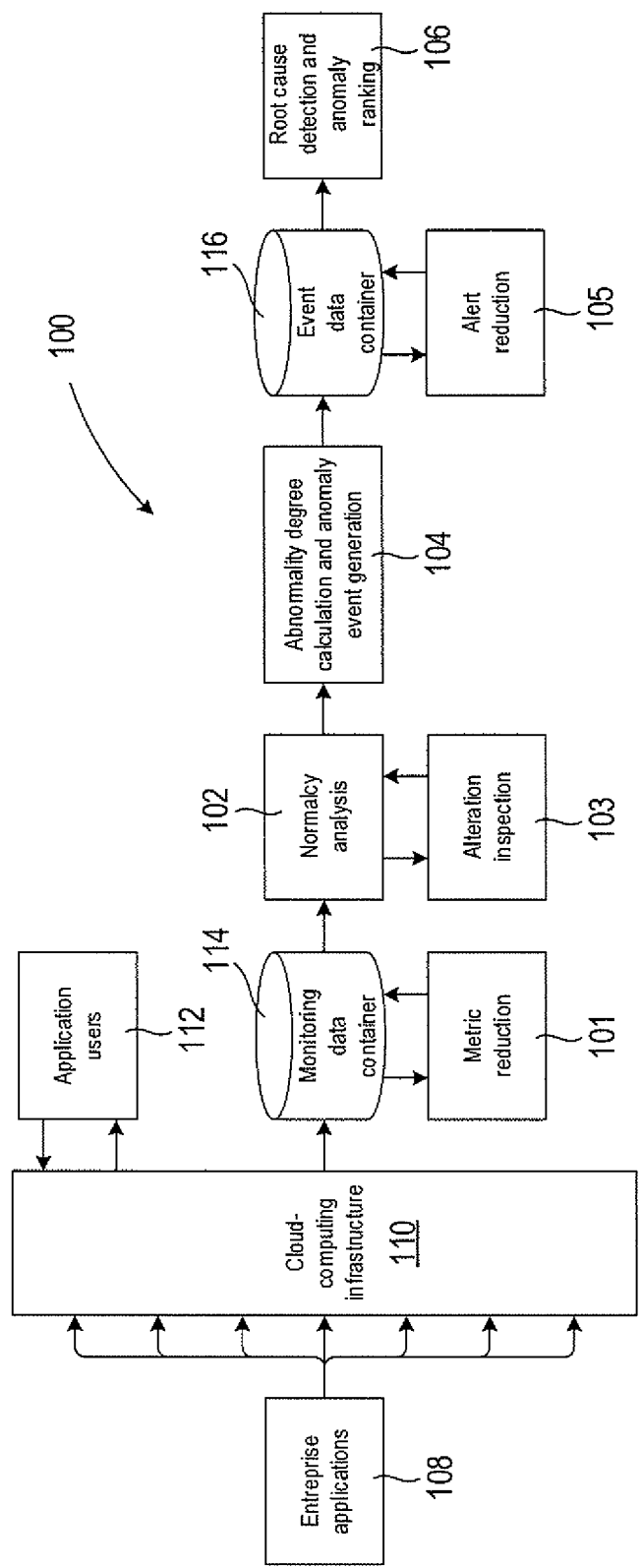
FIG. 1 shows an example of a metric data management method.

FIG. 1 shows an example of a metric data management method 100 implemented as six modules 101-106. In the example of FIG. 1, a number of enterprise applications 108 are run in a cloud-computing infrastructure 110 that provides a platform for using the applications by application users 112. The cloud-computing infrastructure 110 generates N sets of different types of metric data denoted by $$\{x^{(i)}(t)\}_{i=1}^{N} \quad (1)$$

where $x^{(i)}(t)$ denotes the i-th set of metric data.
The N sets may collectively be called "big data." Each set of metric data $x^{(i)}(t)$ represents usage or performance of a particular application or application module running in the cloud-computing infrastructure 110, or use of computational resources of the cloud-computing infrastructure 110. Each set of metric data consists of time-series data represented by $$x^{(i)}(t) = \{x^{(i)}(t_k)\}_{k=1}^{n} = \{x_k^{(i)}\}_{k=1}^{n} \quad (2)$$

where $x_k^{(i)} = x^{(i)}(t_k)$ represents a metric value measured at the k-th time stamp $t_k$.

Figure 2:
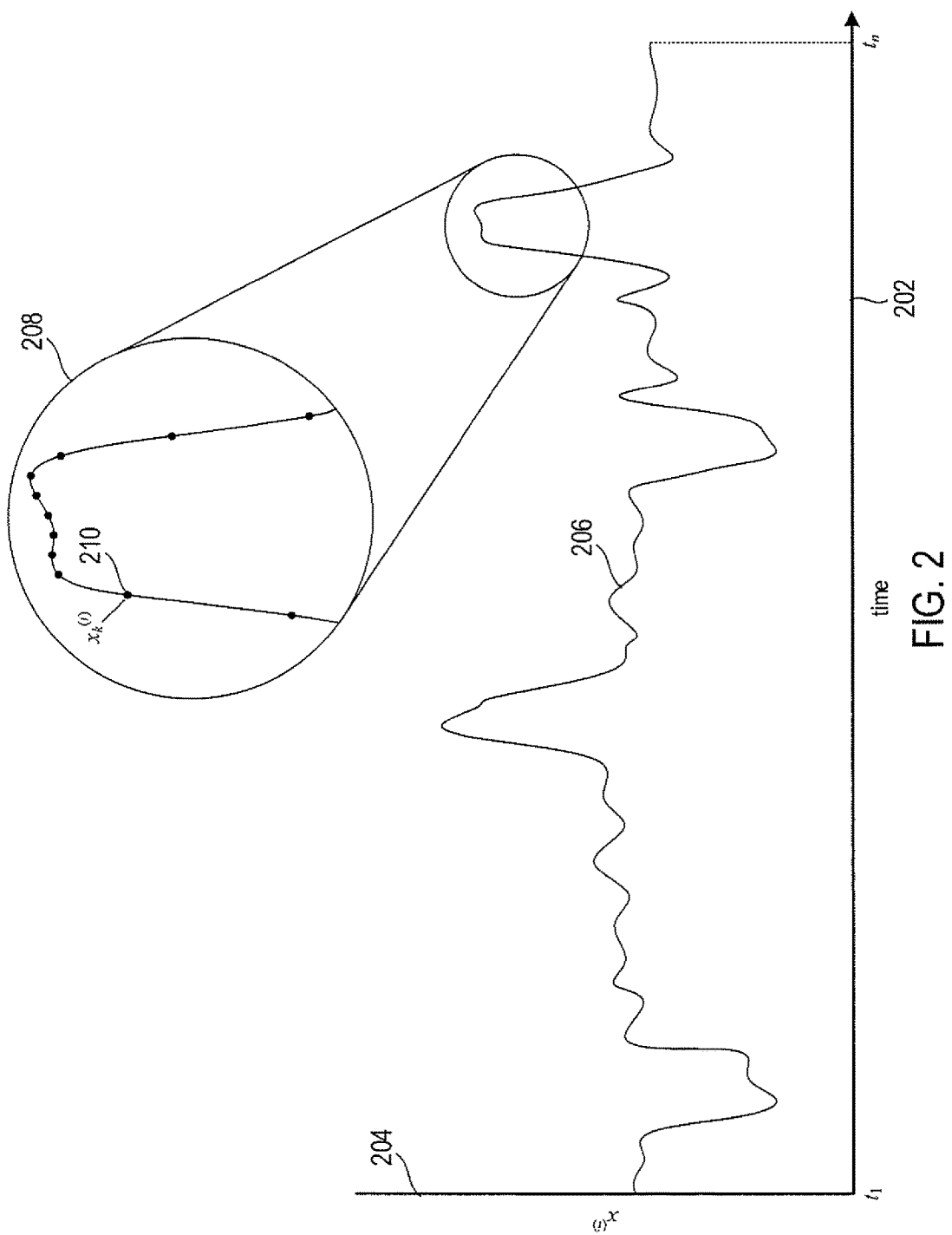
FIG. 2 shows a plot of example set of metric data.

FIG. 2 shows a plot of example time-series data associated with the i-th metric of the set of metric data is represented by Equation (2). Horizontal axis 202 represents time and vertical axis 204 represents a range of metric values. Curve 206 represents time-series data generated by the cloud-computing infrastructure 110 in FIG. 1. FIG. 2 includes a magnified view 208 of metric values. Each metric value represents the result of a measurement performed at a time stamp. Solid dots, such as solid dot 210, represent a metric value $x_k^{(i)}$ at a time stamp $t_k$.

Returning to FIG. 1, the management method 100 uses the six modules 101-106 to apply different data-analytical tools on different levels of data abstraction to reduce the overall volume of metric data and determine a root-cause and rank of abnormalities contained in the metric data. Each set of metric data generated by the cloud-computing infrastructure 110 is collected during a specified monitoring time, which may be different for different sets of metric data. The sets of metric data are stored in a monitoring data container 114. The monitoring data container 114 may be a data-storage device or a data structure. The monitoring data container 114 may be partitioned into two or more sub-containers in which different sets of metric data may be stored. The modules 101-106 perform different operations on the sets of metric data. A metric reduction module 101 performs metric quantity reduction by deleting low-variability sets of metric data and deletes highly correlated sets of metric data. Uncorrelated sets of metric data that are sufficiently variability pass through to a normalcy analysis module 102 that calculates the normalcy bounds (i.e., upper and lower dynamic, or hard, thresholds) for each set of metric data that survives the metric reduction module 101. An alteration inspection module 103 calculates a data-to-threshold ("DT") alteration degree in order to recognize normal behavior of sets of metric data against the thresholds determined by the normalcy analysis module 102. In other words, the alteration inspection module 103 compares behavior of historical sets of metric data with behavior of a current set of metric data in order to determine which thresholds should be recalculated. Abnormality degree calculation and anomaly event generation module 104 constructs a next level of abstraction by generating alerts based on metric data that violate normalcy bounds. A metric data that violates normalcy bounds is called an "event" The sets of metric data are collected in an event data container 116. The event data container 116 may be a data-storage device or a data structure. Event reduction module 105 performs a next level of reduction by deleting sets of metric data based on whether or not the events are correlated. Root-cause detection and anomaly ranking module 106 performs problem identification and/or ranking of reduced event data set.

Metric Reduction Module

Increases in dimensionality and interdependencies of metric data in modern cloud computing infrastructures make dimensionality reduction a core component in any learning application. By removing redundant sets of metric data, learning accuracy is increased and recommendations to handle abnormalities improve by decreasing the overall complexity associated with a large number of sets of metric data. The metric reduction module 101 in FIG. 1 performs reduction on the sets of metric data by deleting those sets of metric data with a small standard deviation and are correlated with other sets of metric data. A number of the sets of metric data may be coming from unloaded parts of the infrastructure and the behavior of such low-variability (i.e., mostly constant) sets of metric data are meaningless regarding further analysis. The sets of metric data within a group will most probably be better correlated than metric data collected from a number of different groups.

The metric reduction module 101 reduces the number of sets of metric data as follows. The metric reduction module 101 begins by computing the standard deviation of each set of metric data as follows:

$$\sigma^{(i)} = \sqrt{\frac{1}{n}\sum_{k=1}^{n}(x_k^{(i)} - \mu^{(i)})^2} \quad (3a)$$

where the mean is given by $$\mu^{(i)} = \frac{1}{n}\sum_{k=1}^{n} x_k^{(i)} \quad (3b)$$

When the standard deviation $\sigma^{(i)} > \epsilon_{st}$, where $\epsilon_{st}$ is a standard deviation threshold (e.g., $\epsilon_{st}=0.01$), the set of metric data $x^{(i)}(t)$ is retained. Otherwise, when the standard deviation $\sigma^{(i)} \leq \epsilon_{st}$, the set of metric data $x^{(i)}(t)$ is deleted from the monitoring data container 114.

Figure 3A:
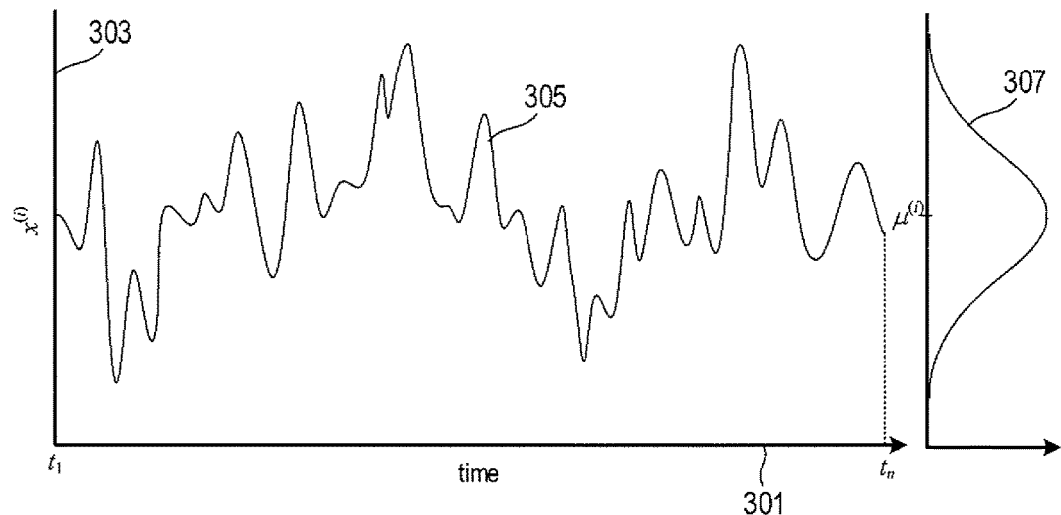
FIGS. 3A-3B show plots of two example sets of metric data.
Figure 3B:
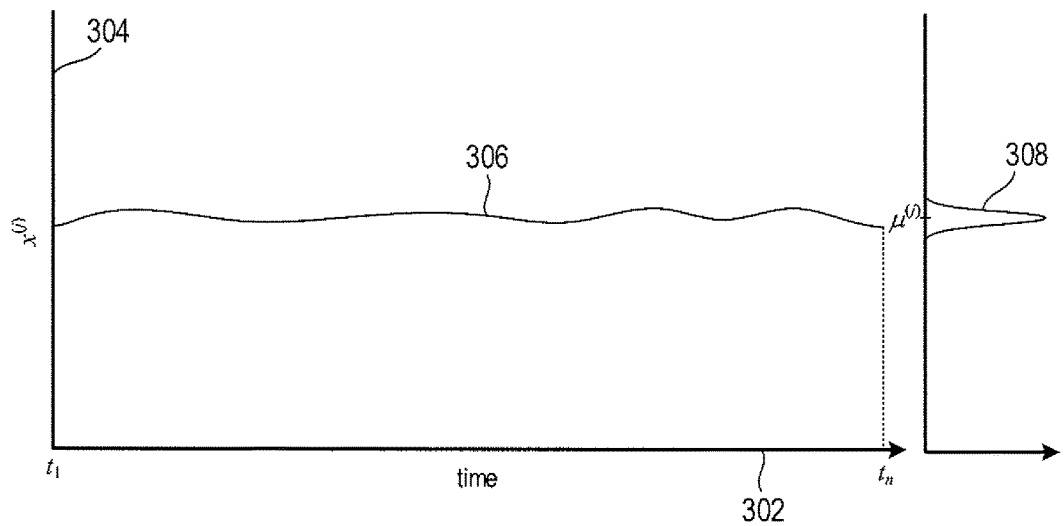

FIGS. 3A-3B shows plots of two different example sets of metric data.

Horizontal axes 301 and 302 represent time. Vertical axis 303 represents a range of metric values for a first set of metric data $x^{(i)}(t)$ and vertical axis 304 represents the same range of metric values for a second set of metric data $x^{(j)}(t)$. Curve 305 represents the set of metric data $x^{(i)}(t)$ over a time interval between time stamps $t_1$ and $t_n$ and curve 306 represents the set of metric data $x^{(j)}(t)$ over the same time interval. FIG. 3A includes a plot an example first distribution 307 of the first set of metric data centered about a mean value $\mu^{(i)}$, and FIG. 3B includes a plot an example second distribution 308 of the second set of metric data centered about a mean value $\mu^{(j)}$. The distributions 307 and 308 reveal that the first set of metric data 305 has a much higher degree of variability than the second set of metric data.

Figure 4:
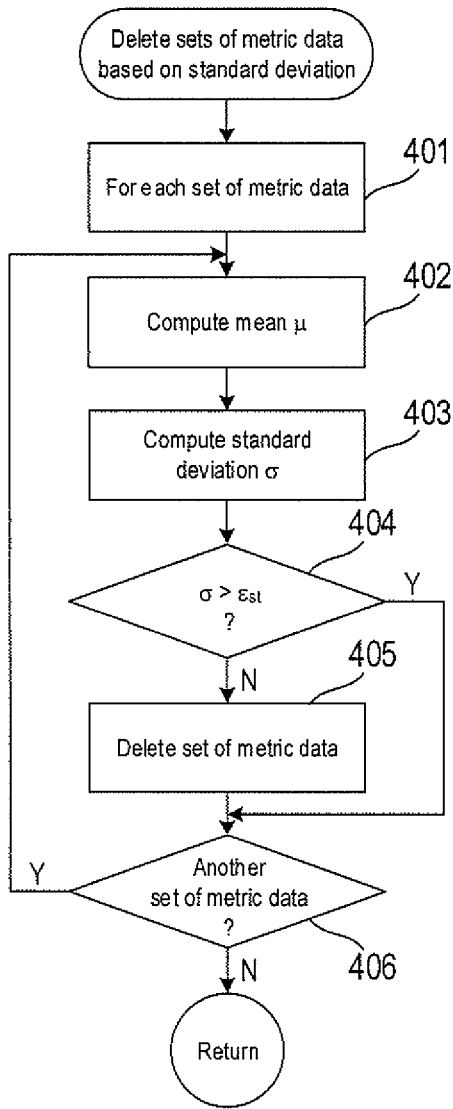
FIG. 4 shows a flow-control diagram of a method to delete sets of metric data based on standard deviation.

FIG. 4 shows a flow-control diagram of a method to delete sets of metric data based on standard deviation. A for-loop beginning with block 401 repeats the operations represented by blocks 402-406 for each set of metric data stored in the monitoring data container 114. In block 402, a mean data value is computed according to Equation (3b). In block 403, a standard deviation is computed according to Equation (3a). In decision block 404, when the standard deviation is greater than a threshold, control flows decision block 406. Otherwise, control flows to block 405 and the set of metric data is deleted from the monitoring data container 106. In decision block 406, the operations represented by blocks 402-405 are repeated for a different set of metric data stored in the monitoring data container 114.

The metric reduction module 101 may also reduce the number of sets of metric data stored in the monitoring data container 114 based on correlation. However, before further reducing the number of sets of metric data, if the time-series data of the sets of metric data are not synchronized in time, the metric reduction module 101 performs time synchronization of the sets of metric data using data smoothing. For example, time synchronization may be performed using a sliding time window.

Figure 5A:
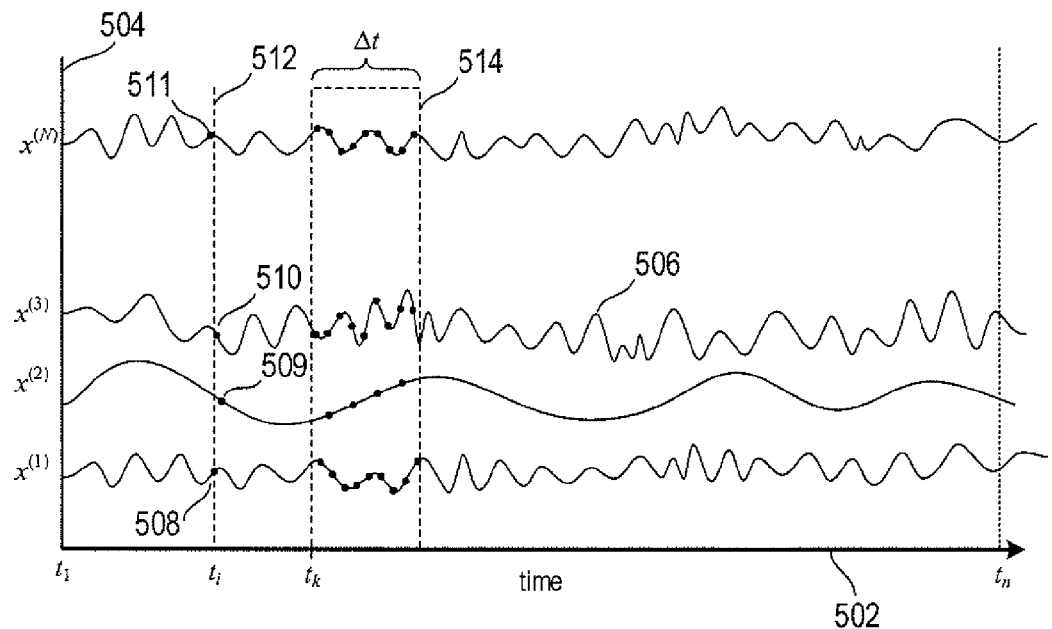
FIGS. 5A-5B show a plot of example sets of unsynchronized metric data.
Figure 5B:
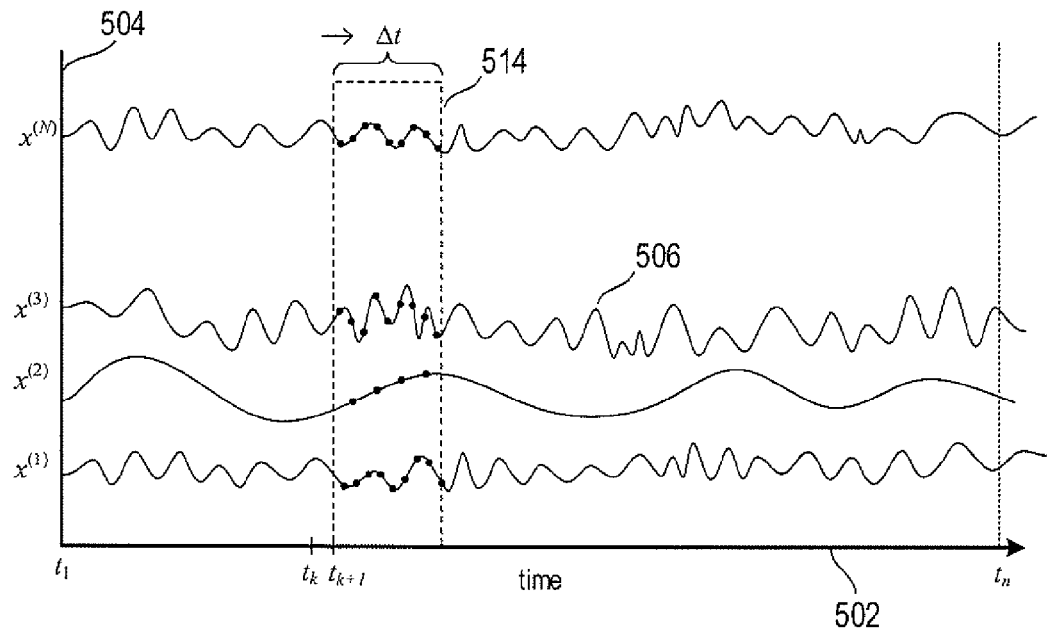

FIGS. 5A-5B show a plot of example sets of metric data that are not synchronized with the same time stamps. Horizontal axis 502 represents time and vertical axis 504 represents sets of metric data. Curves, such as curve 506, represent different sets of metric data. Solid dots represent metric values recorded at different time stamps. For example, solid dot 508 represents a metric value recorded at time stamp $t_i$. Solid dots 509-511 also represents metric values recorded for each of the other sets of metric data with time stamps closest to the time stamp $t_i$, represented by dashed line 512. However, in this example, because the metric values were recorded at different times, the time stamps of the metric values 509-511 are not aligned in time with the time stamp $t_i$. Dashed-line rectangle 514 represents a sliding window with time width $\Delta t$. For each set of metric data, the metric values with time stamps that lie within the sliding time window are smoothed and assigned the earliest time defined by the sliding time window. In one implementation, the metric values with time stamps in the sliding time window may be smoothed by computing an average as follows:

$$x^{(i)}(t_k) = \frac{1}{L}\sum_{l=1}^{L} x^{(i)}(t_l) \qquad (4)$$

where
$t_k \leq t_l \leq t_k + \Delta t$; and
L is the number of metric values in the time window.

In an alternative implementation, the metric values with time stamps in the sliding time window may be smoothed by computing a median value as follows:

$$x^{(i)}(t_k) = \mathrm{median}\{x^{(i)}(t_l)\}_{l=1}^{L} \qquad (5)$$

After the metric values of the sets of metric data have been smoothed for the time window time stamp $t_k$, the sliding time window is incrementally advance to next time stamp $t_{k+1}$, as shown in FIG. 5B. The metric values with time stamps in the sliding time window are smoothed and the process is repeated until the sliding time window reaches a final time stamp $t_n$.

The metric reduction module 101 then computes a correlation matrix of the synchronized sets of metric data. FIG. 6 shows an example a N×N correlation matrix of N sets of metric data. Each element of the correlation matrix may be computed as follows:

$$\mathrm{corr}(x^{(i)}, x^{(j)}) = \frac{\sum_{k=1}^{n}(x_k^{(i)} - \mu^{(i)})(x_k^{(j)} - \mu^{(j)})}{\sigma^{(i)}\sigma^{(j)}} \qquad (6)$$

The correlation matrix is a symmetric matrix. The eigenvalues of the correlation matrix are computed and a numerical rank of the correlation matrix is determined from the eigenvalues based on tolerance $0 < \tau \leq 1$. In particular, the tolerance $\tau$ may be in an interval $0.8 \leq \tau \leq 1$. Consider a set of eigenvalues of the correlation matrix given by:

$$\{\lambda_k\}_{k=1}^{N} \qquad (7)$$

The eigenvalues of the correlation matrix are positive and arranged from largest to smallest (i.e., $\lambda_k \geq \lambda_{k+1}$ for $k=1, \ldots, N$). The accumulated impact of the eigenvalues are determined based on the tolerance $\tau$ according to the following conditions:

$$\frac{\lambda_1 + \ldots + \lambda_{m-1}}{N} < \tau \qquad (8a)$$

$$\frac{\lambda_1 + \ldots + \lambda_{m-1} + \lambda_m}{N} \geq \tau \qquad (8b)$$

where m is the numerical rank of the correlation matrix. The numerical rank m indicates that the set of metric data $\{x^{(i)}(t)\}_{i=1}^{N}$ has m independent sets of time-series data.

Given the numerical rank m, the m independent sets of metric data may be determined using QR decomposition of the correlation matrix. In particular, the m independent sets of metric data are determined based on the m largest diagonal elements of the R matrix obtained from QR decomposition.

FIG. 7 shows the correlation matrix of FIG. 6 and QR decomposition of the correlation matrix. The N columns of the correlation matrix are denoted by $C_1, C_2, \ldots, C_N$, N columns of the Q matrix are denoted by $Q_1, Q_2, \ldots, Q_N$, and N diagonal elements of the R matrix are denoted by $r_{11}, r_{22}, \ldots, r_{NN}$. The columns of the Q matrix are determined based on the columns of the correlation matrix as follows:

$$Q_i = \frac{U_i}{\|U_i\|} \qquad (9a)$$

where
$\|U_i\|$ denotes the length of a vector $U_i$; and
the vectors $U_i$ are calculated according to $$U_1 = C_1 \qquad (9b)$$

$$U_i = C_i - \sum_{j=1}^{i-1} \frac{\langle Q_j, C_j \rangle}{\langle Q_j, Q_j \rangle} Q_j \qquad (9c)$$

where $\langle \cdot, \cdot \rangle$ denotes the scalar product.
The diagonal matrix elements of the R matrix are given by $$r_{ii} = \langle Q_i, C_i \rangle \qquad (9d)$$

The time-series data that correspond to the largest m (i.e., numerical rank) diagonal elements of the R matrix are selected. The remaining time-series data may be deleted from the monitoring data container 114.

Figure 8:
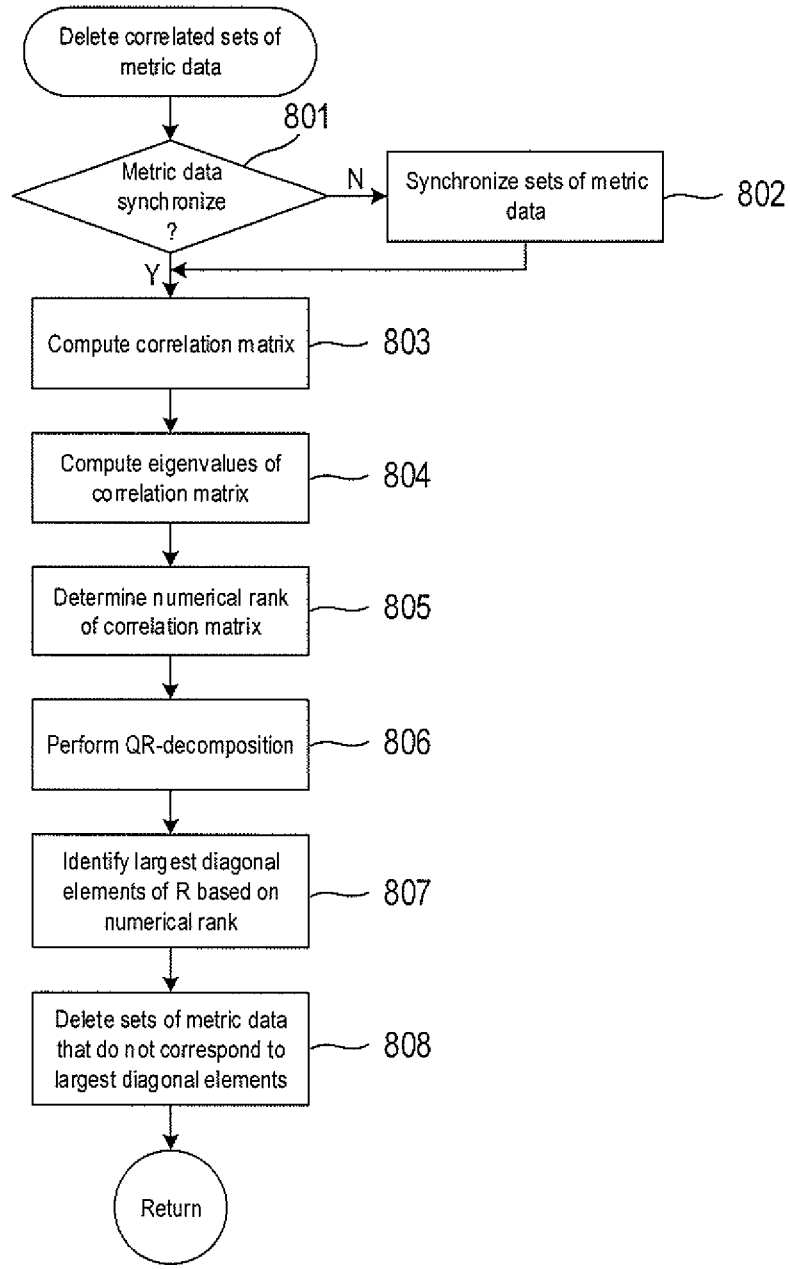
FIG. 8 shows a flow-control diagram of a method to delete correlated sets of metric data.

FIG. 8 shows a flow-control diagram of a method to delete correlated sets of metric data stored in the monitoring data container 114. In decision block 801, if the sets of metric data are synchronized, control flows to block 803, otherwise, control flows to block 802. In block 802, the sets of metric data are smoothed at the same time stamps as described above with reference to FIG. 5 and Equations (4) and (5). In block 803, a correlation matrix is computed as described above with reference to FIG. 6 and Equation (6). In block 804, eigenvalues of the correlation matrix determined block 803 are determined. In block 805, a numerical rank m of the correlation matrix is determined based on the eigenvalues and tolerance as described above with reference to Equations (8a) and (8b). In block 806, the process of QR decomposition is applied to the correlation matrix to determine the diagonal elements of a matrix as described above with reference to FIG. 7 and Equations (9a)-(9d). In block 807, the m largest diagonal elements of the matrix R are used to identify corresponding time-series data. In block 808, time-series data that does not correspond to the m largest diagonal elements of the matrix R are deleted from the monitoring data container 114.

Normalcy Analysis Module

Figure 9:
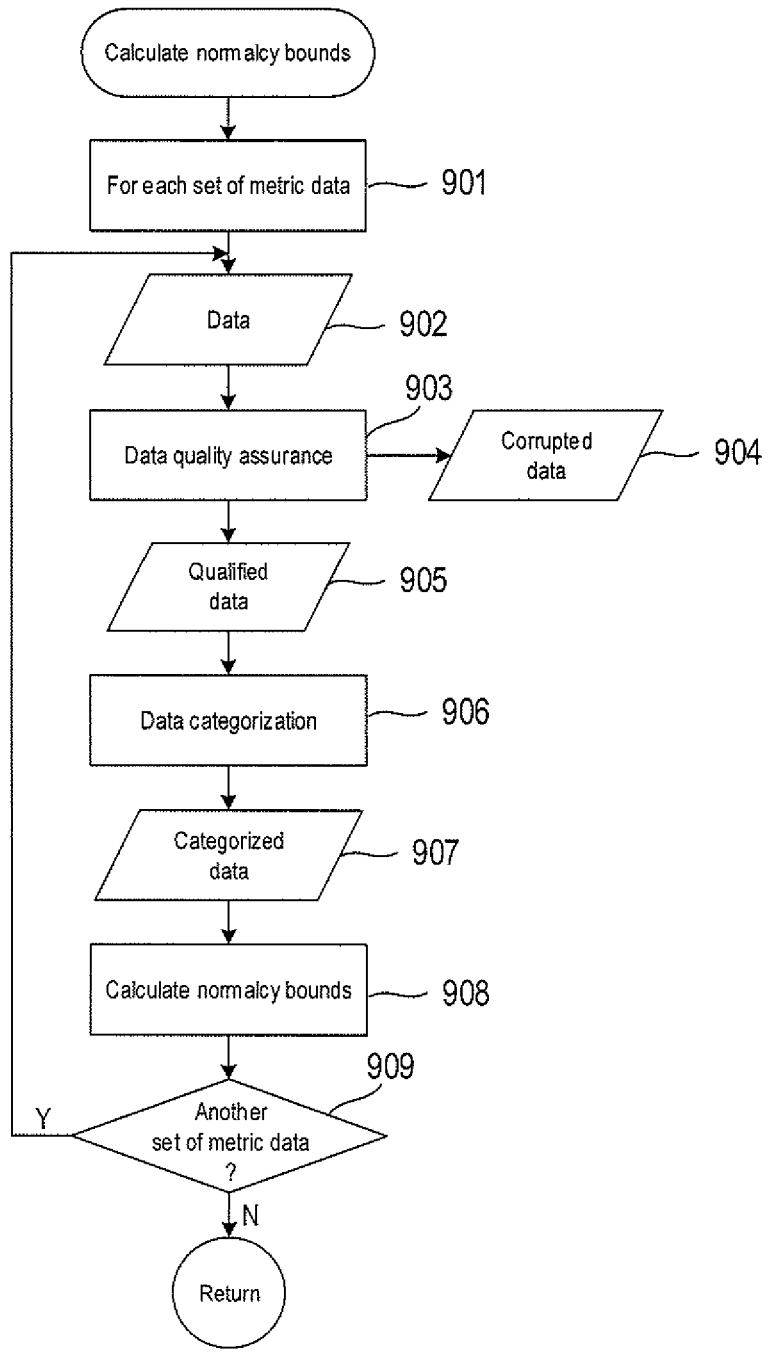
FIG. 9 shows a flow-control diagram of a generalized method to calculate normalcy bounds.

After sets of metric data have been deleted by the metric reduction module 101 of FIG. 1, the normalcy analysis module 102 of FIG. 1 provides a fully data-agnostic method to calculate normalcy bounds based on analyzing and categorizing the sets of metric data remaining in the monitoring data container 114. FIG. 9 shows a flow-control diagram of a generalized method to calculate normalcy bounds. The method utilizes data quality assurance ("DQA") and data categorization ("DC") processes represented by blocks 903 and 906. A for-loop beginning with block 901 repeats the operations represented by blocks 903, 906, 908, and 909 for each set of metric data. In block 903, DQA receives a set of metric data stored in the monitoring data container 114 of FIG. 1. The DQA identifies a set of metric data 902 as either corrupted data 904 or qualified data 905 by checking a set of metric data 902 against different statistical characteristics defined for data qualification. A corrupted set of metric data 904 is regarded as useless for further analysis and may be deleted. In block 906, DC identifies and sorts the qualified set of metric data 905 into one of a number of different types of categorized data 907. In other words, for each qualified set of metric data, the DC 906 performs category checking and identification with hierarchical/priority ordering. In block 908, category specific normalcy analysis is performed to determine normalcy bounds for the categorized set of metric data 907. It should be noted that the type of category specific normalcy analysis applied to the categorized set of metric data 907 depends on which statistical category the set of metric data 907 belongs to. The categorized data 907 may be input to an alerting engine for abnormality detection via comparison with normalcy bounds (i.e., upper and lower dynamic or hard thresholds). In decision block 909, the operations represented by blocks 903, 906, and 908 are repeated for another set of metric data.

Figure 10:
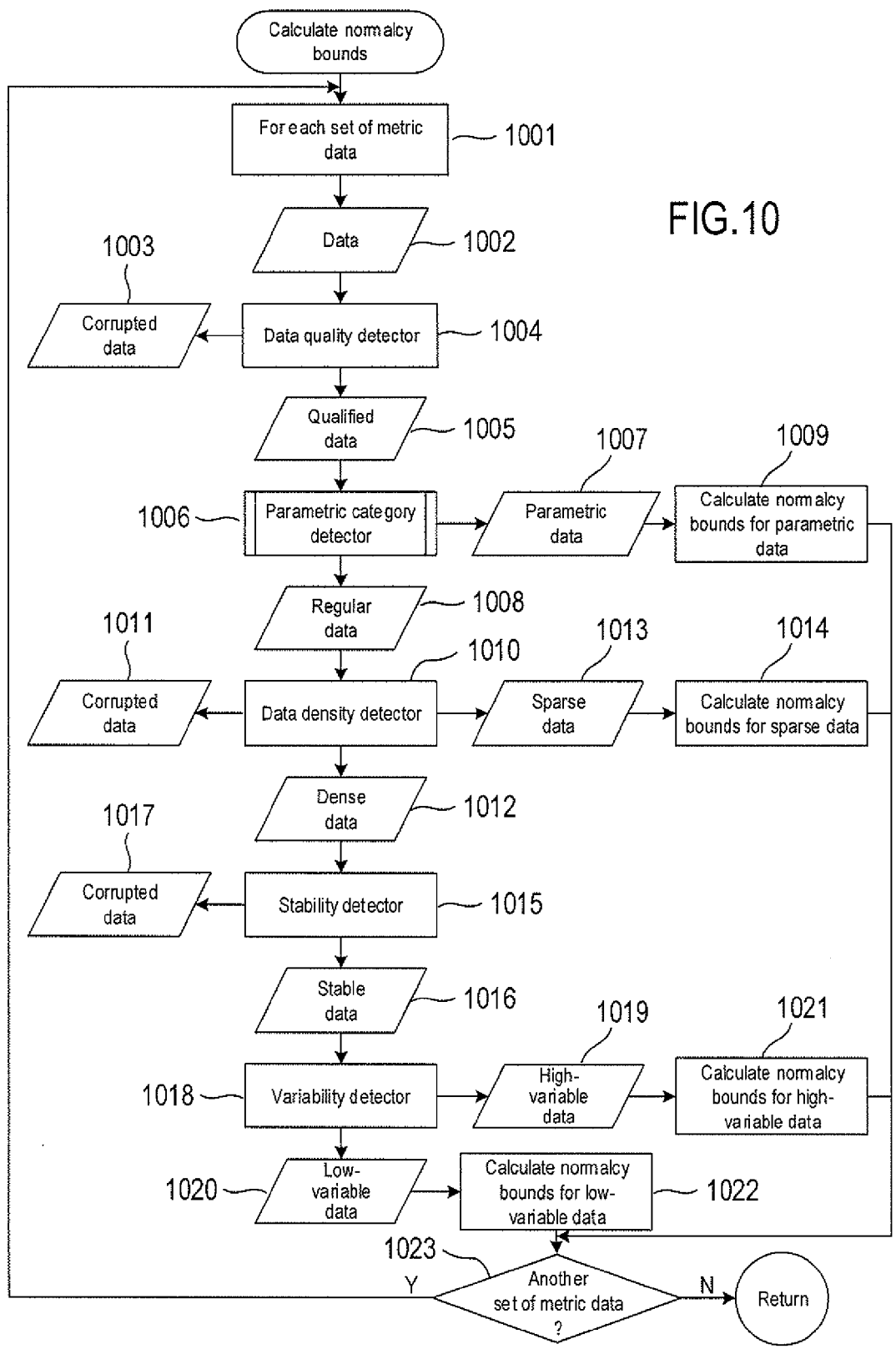
FIG. 10 shows a flow-control diagram of a method to calculate normalcy bounds.

FIG. 10 shows a flow-control diagram of a method to calculate normalcy bounds that provides a more detailed representation of the DQA process in block 903 and the DC process in block 906 of FIG. 9. A for-loop beginning with block 1001 repeats the operations represented by blocks 1004, 1006, 1010, 1015, and 1018 for each set of metric data retrieved from the monitory data container 114 of FIG. 1. The operations represented by blocks 1004, 1010, and 1015 comprise the DQA process represented by block 903 in FIG. 9, and the operations represented by blocks 1006 and 1018 comprise the DC process represented by block 906 in FIG. 9. In block 1004, a data quality detector receives a set of metric data 1002 and performs a check of whether or not the set of metric data satisfies sufficient statistics. Sufficient statistics may be user defined parameters about the set of metric data. For example, sufficient statistics may be a requirement that the set of metric data have a minimum number of data values and/or the duration of the set of metric data is greater than a minimum time-series duration. The set of metric data is identified as corrupted data 1003 if the metric data does not have sufficient statistical information or the set of metric data is identified as qualified data 1005. In block 1006, a routine "parametric category detector" is called to perform data categorization on the qualified set of metric data 1005 based on selected statistical parametric models. The parametric category detector 1006 categorizes the set of metric data 1007 as a particular type of parametric data, which may be one of multinomial data, transient data, semi-constant data, and trendy data, as described below with reference to FIG. 11. Otherwise, the parametric category detector 1006 identifies the qualified set of metric data 1005 as a regular set of metric data 1008. Normalcy analysis 1009 is performed to determine normalcy bounds for the parametric data 1007. In block 1010, a data density detector assesses gaps in the regular set of metric data 1008. When the regular data 1008 is identified as having a high percentage of gaps, the regular set of metric data is considered corrupted data 1011 that may be deleted. When the regular set of metric data 1008 is identified as having a lower percentage of gaps, the regular set of metric data is considered as being composed of dense data 1012. The data density detector 1010 may also categorize the regular set of metric data 1008 as sparse data 1013 when the regular set of metric data includes a high percentage of gaps that are uniformly distributed in time. In block 1014, normalcy analysis is applied to determine normalcy bounds for the sparse set of metric data 1013. In block 1015, a stability detector analyzes the dense set of metric data 1012 in terms of statistical stability. When the dense set of metric data 1012 is piecewise stable the dense set of metric data is further identified as a stable set of metric data 1016, otherwise, the dense set of metric data 1012 is categorized as corrupted data 1017 that may be deleted. In block 1018, a variability detector receives the stable set of metric data 1016 and categorizes the data as high-variability data 1019 or low-variability data 1020. In blocks 1021 and 1022, normalcy analysis is performed to determine normalcy bounds for the high-variable data 1019 and the low-variable data 1020. In decision block 1023, the operations represented by blocks 1004, 1006, 1010, 1015 and 1018 are repeated for another set of metric data.

Figure 11:
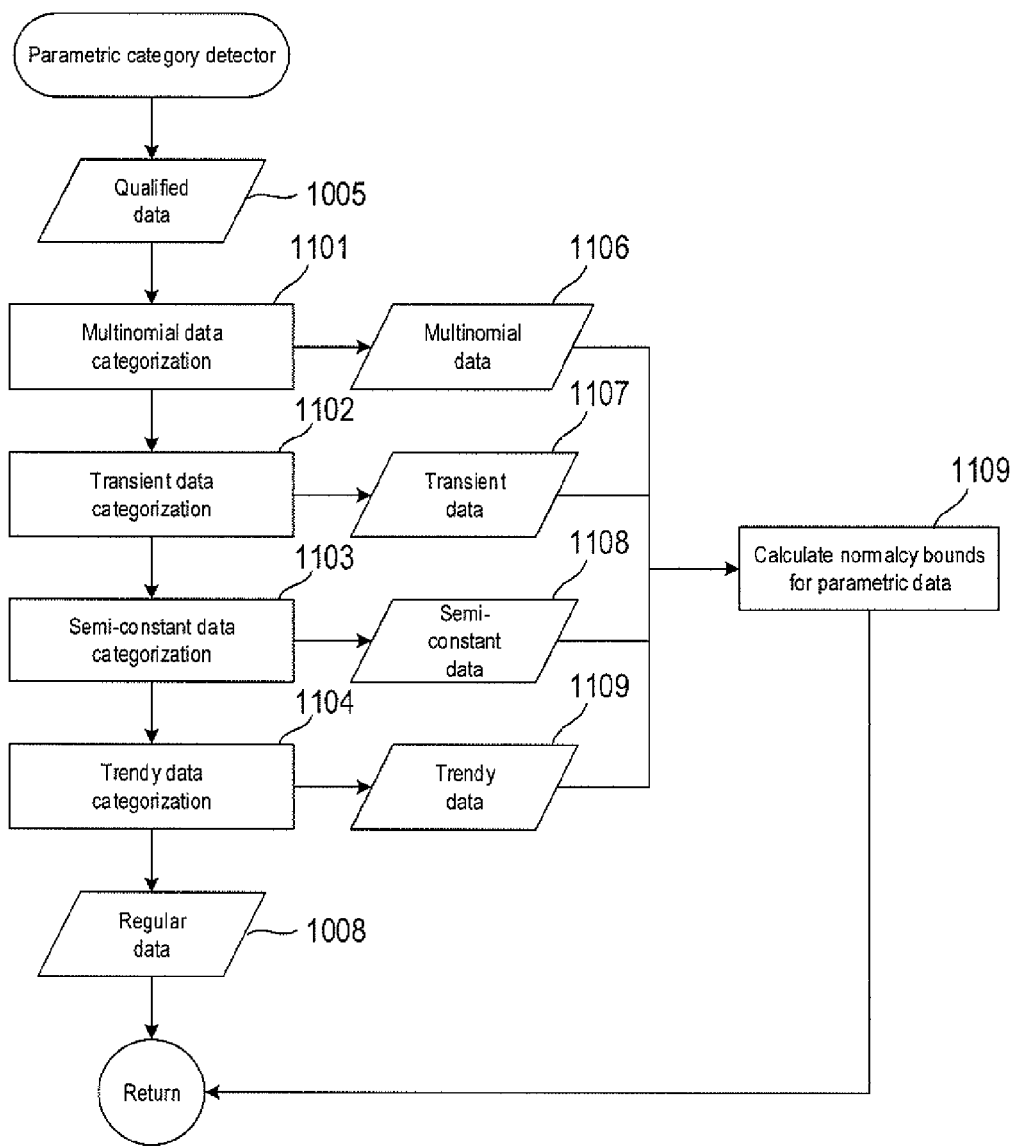
FIG. 11 shows an example flow-control diagram of a routine "parametric category detector" called in FIG. 10.

FIG. 11 shows an example flow-control diagram of the routine "parametric category detector" called in block 1006 of FIG. 10. The blocks 1101-1104 determine which type of parametric data categories the qualified data 1005 belongs to. The parametric data categories are multinomial data 1106, transient data 1107, semi-constant data 1108, and trendy data 1109. When the qualified set of metric data 1005 does not belong to any of the four categories identified in blocks 1101-1104, the qualified set of metric data 1005 is identified as regular data 1008. The routine shown in FIG. 11 includes the normalcy analysis 1009 applied the parametric data categories 1106-1109.

Techniques for determining the normalcy bounds described in block 908 of FIG. 9 and in blocks 1009, 1014, 1021, and 1022 of FIG. 10 are described in greater detail in U.S. patent application Ser. No. 13/853,321, Publication No. 2014/0298098, filed Mar. 29, 2013, owned by VMWare, Inc.

Abnormality Degree Calculation and Anomaly Event Generation Module

The abnormality degree calculation and anomaly event generation module 104 of FIG. 1 provides abnormality degree estimation based on hard or dynamic normalcy ranges (i.e., upper and lower thresholds). The premise behind module 104 is that a set of metric data may violate a threshold for a period of time. The modules determines historical and current degrees of abnormality. Threshold violations are determined by computing a distance of each metric value from upper and lower thresholds. Consider a set of historical time-series data represented by Equation (2). Let $u_k^{(i)}$ denote the value of an upper threshold at time stamp $t_k$ for the i-th set of metric data. The distance of a metric value $x_k^{(i)}$ from the upper threshold $u_k^{(i)}$ at time stamp $t_k$ is given by.

$$d_k^u = x_k^{(i)} - u_k^{(i)} \qquad (10)$$

Likewise, let $l_k$ denote the value of a lower threshold at time stamp $t_k$ for the i-th set of metric data. The distance of a data value $x_k^{(i)}$ from the lower threshold $l_k^{(i)}$ at the time stamp $t_k$ is given by:

$$d_k^l = x_k^{(i)} - l_k^{(i)} \qquad (11)$$

When the distance $d_u^k \geq 0$ and the distance $d_k^l \leq 0$, the data value $x_k^{(i)}$ is considered normal and a threshold violation has not occurred. On the other hand, when either $d_k^u > 0$ or $d_k^l > 0$ occurs, the data value $x_k^{(i)}$ is considered abnormal and a threshold violation has occurred.

Figure 12A:
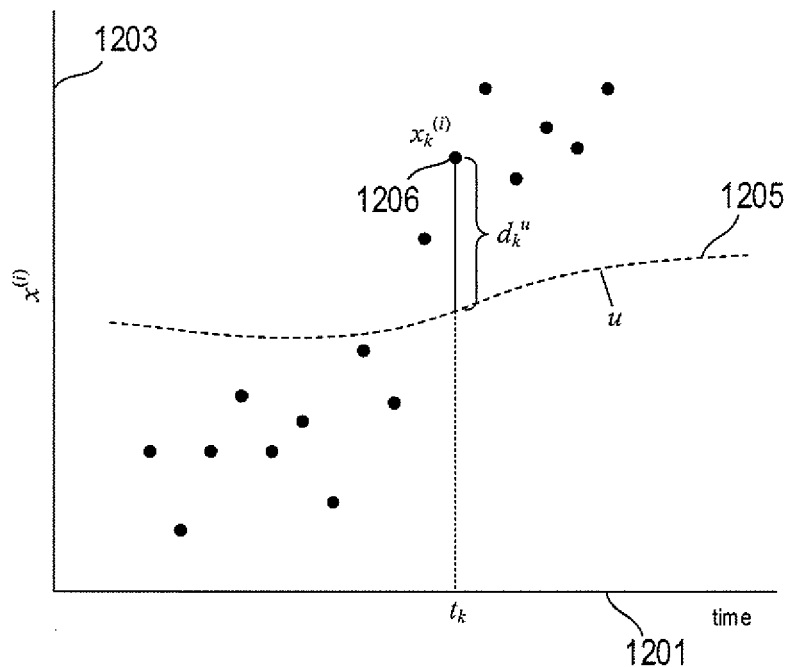
FIGS. 12A-12B show plots of example upper and lower threshold violations.
Figure 12B:
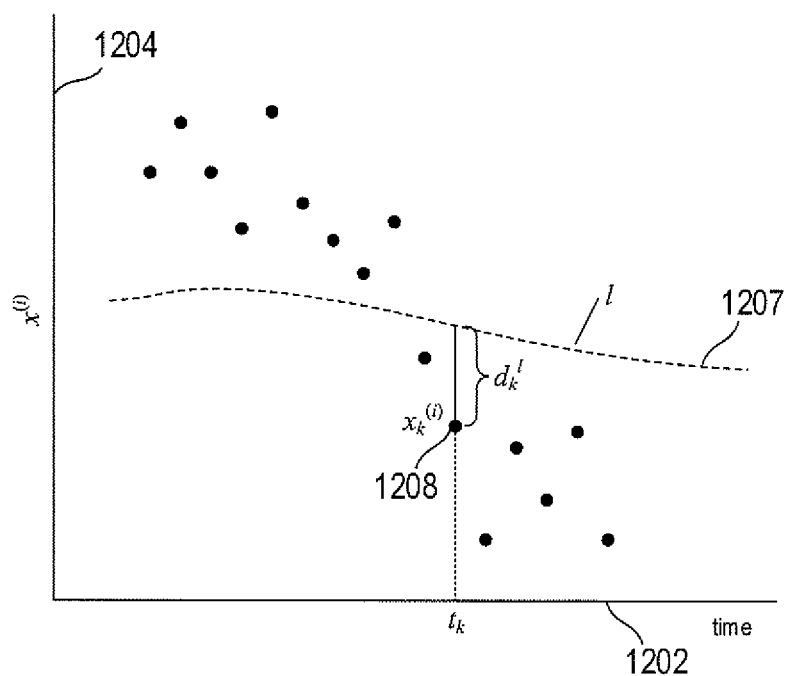

FIGS. 12A-12B show plots of example upper and lower threshold violations. Horizontal axes 1201 and 1202 represent time and vertical axes 1203 and 1204 represent a range of metric values. Solid dots represent metric values. In FIG. 12A, dashed curve 1205 represents an upper dynamic threshold denoted by u. Metric values greater than the upper threshold 1205, such as metric value 1206, have distances $d_k^u$ greater than zero and correspond to a sequence of upper threshold violations. In FIG. 12B, dashed curve 1207 represents a lower dynamic threshold denoted by l. Metric values less than the lower threshold 1207, such as metric value 1208, have distances $d_k^u$ greater than zero and correspond to a sequence of lower threshold violations.

Figure 13:
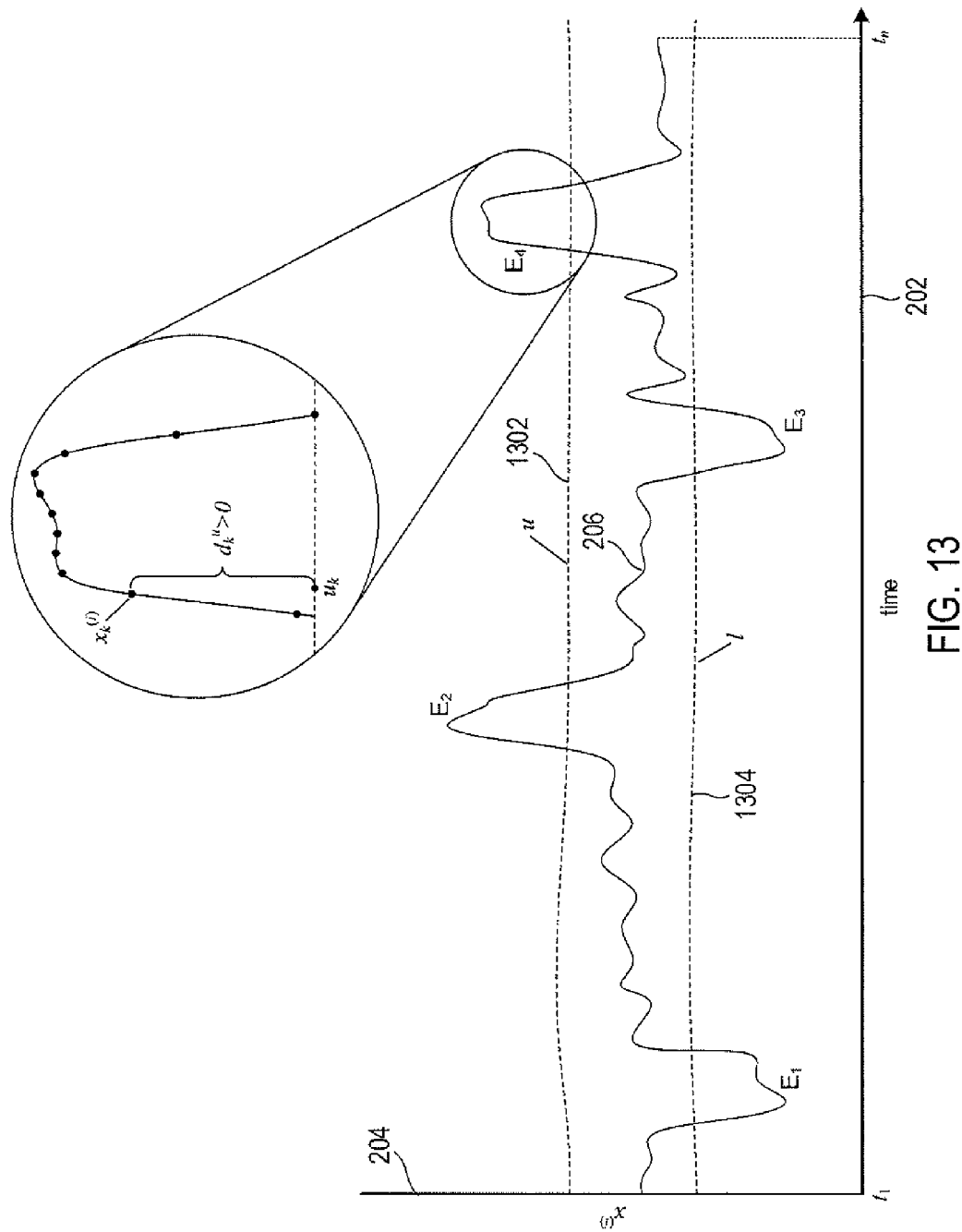
FIG. 13 shows the set of metric data shown in FIG. 2 with upper and lower dynamic thresholds.

A sequence of threshold violations is called an "event." FIG. 13 shows the time-series data shown in FIG. 2 with upper and lower dynamic thresholds added. The time-series data represents historical time-series data recorded between time $t_1$ and $t_n$. Dashed curve 1302 represents an upper dynamic threshold and dashed curve 1304 represents a lower dynamic threshold. A constant upper or lower threshold would be represented by a straight line that runs parallel to the time axis 202. The time-series data 206 includes four events denoted by $E_1$, $E_2$, $E_3$, and $E_4$. The events $E_1$ and $E_3$ are each composed of a sequence of consecutive time-series data that are less the lower threshold 1304 and are called "lower-threshold events." Each of the lower-threshold events $E_1$ and $E_3$ corresponds to a sequence of time-series data values where $d_k^l > 0$. The events $E_2$ and $E_4$ are composed of a sequence of consecutive time-series data that are greater than the upper threshold 1302 and are called "upper-threshold events." Each of the upper-threshold events $E_2$ and $E_4$ corresponds to a sequence of consecutive time-series data values where $d_k^u > 0$.

The distances $d_k^u > 0$ for the full set of time-series data may be collected to form a set of historical upper-threshold event distances given by $$D^u = \{d_k^u\}_{k=1}^M \qquad (12)$$

where
$d_k^u > 0$; and
M is the number of historical upper threshold violations.

Likewise, the distances $d_k^l > 0$ for the full set of time-series data may also be collected to form a set of historical lower-threshold event distances given by $$D^l = \{d_k^l\}_{k=1}^R \qquad (13)$$

where
$d_k^l > 0$; and
R is the number of historical lower threshold violations.

Alternatively, a single distance metric may be calculated for each upper-threshold event, and the distance metrics associated with each upper threshold event may be collected to form a set of historical upper-threshold distance metrics. Consider an upper-threshold event $E_j$ composed of a set of m distances greater than zero:

$$d_1^{u(j)}, d_2^{u(j)}, \ldots, d_m^{u(j)} \qquad (14)$$

where $d_i^{u(j)} > 0$, for $1 \leq i \leq m$.
A distance metric for the upper-threshold event E may calculated as follows:

$$\bar{d}_j^u = \varphi(d_1^{u(j)}, d_2^{u(j)}, \ldots, d_m^{u(j)}) \qquad (15)$$

where $\varphi$ represents one of the mean, median, and maximum of the distances.

This procedure may be repeated for each upper-threshold event and the distance metrics associated with the upper-threshold events may be collected to form a set of historical upper-threshold distance metrics represented by:

$$\bar{D}^u = \{\bar{d}_j^u\}_{j=1}^J \qquad (16)$$

where J represents the number of upper-threshold events.
Likewise, consider a lower-threshold event $E_q$ composed of r lower-threshold distances greater than zero:

$$d_1^{l(q)}, d_2^{l(q)}, \ldots, d_r^{l(q)} \qquad (17)$$

where $d_i^{l(q)} > 0$, for $1 \leq i \leq r$.
A distance metric may be calculated as follows:

$$\bar{d}_q^u = \varphi(d_1^{u(q)}, d_2^{u(q)}, \ldots, d_r^{u(q)}) \qquad (18)$$

where $\varphi$ represents one of the mean, median, and maximum of the distances.

The distance metrics of the lower-threshold events may be collected to form a set of historical lower-threshold distance metrics represented by:

$$\bar{D}^l = \{\bar{d}_q^l\}_{q=1}^Q \qquad (19)$$

where Q represents the number of lower-threshold events.
The event counts of the upper-threshold events may be collected to form a set of historical upper-threshold event counts given by $$C^u = \{c_j\}_{j=1}^J \qquad (20)$$

where $c_j$ represents the number of upper-threshold violations comprising the upper-threshold event $E_j$.

Analogously, the event counts of the lower-threshold events may also be collected to form a set of historical lower-threshold event counts given by $$C^l = \{c_q\}_{q=1}^Q \qquad (21)$$

where $C_q$ represents the number of upper-threshold violations comprising the upper-threshold event $E_q$.

The sets $C^u$ and $C^l$ are count sets of abnormalities that may be combined with distance sets of abnormalities $D^u$, $D^l$, $\overline{D}^u$, and $\overline{D}^l$ as follows to provide a two-component representation of historical threshold violations. An upper-threshold combined set of abnormalities may be formed from the set of historical upper-threshold event distances and the set of historical upper-threshold event counts as follows:

$$G^u = (D^u, C^u) \qquad (22)$$

Alternatively, an upper-threshold combined set of abnormalities may be formed from the set of historical upper-threshold distance metrics and the set of historical upper-threshold event counts as follows:

$$G^u = (\overline{D}^u, C^u) \qquad (23)$$

Likewise, a lower-threshold combined set of abnormalities may be formed from the set of historical lower threshold distances and the set of historical lower-threshold counts as follows:

$$G^l = (D^l, C^l) \qquad (24)$$

Alternatively, a lower-threshold combined set of abnormalities may be formed from the set of historical lower-threshold distance metrics and the set of historical lower-threshold event counts as follows:

$$G^l = (\overline{D}^l, C^l) \qquad (25)$$

Equations (22)-(25) represent various types of combined sets of abnormalities that may be formed from historical time-series data. In practice, only one upper-threshold combined set of abnormalities and only one lower-threshold combined set of abnormalities are formed from historical time-series data.

In an alternative implementation, upper and lower-threshold event durations may be used instead of upper and lower-threshold event counts in Equations (22)-(25). An upper-threshold event duration may be collected to form a set of historical upper-threshold event durations given by $$T^u = \{\tau_j\}_{j=1}^J \qquad (26)$$

where $\tau_j$ is the duration of the j-th upper-threshold event. The duration may be calculated as $\tau_j = \tau_{j,end} - \tau_{j,start}$, where $\tau_{j,start}$ represents the time stamp of the first metric value in the upper-threshold event $E_j$ to violate the upper threshold and $\tau_{j,end}$ represent the time stamp of the last metric value in the upper-threshold event $E_j$ to violate the upper threshold. Analogously, the durations of the lower-threshold events may also be collected to form a set of historical lower-threshold event durations given by $$T^l = \{\tau_q\}_{q=1}^Q \qquad (27)$$

where $\tau_q$ is the duration of the q-th lower-threshold event.

After an upper-threshold combined set of abnormalities and a lower-threshold combined set of abnormalities are formed from the historical time-series data, a corresponding pair of upper and lower estimated historical degrees of abnormality are determined. Upper and lower threshold estimated historical degrees of abnormality that correspond to the upper and lower combined sets of abnormalities given by Equations (22)-(25) are denoted by $$G_0^u = (D_0^u, C_0^u) \qquad (28a)$$

$$G_0^u = (\overline{D}_0^u, C_0^u) \qquad (28b)$$

$$G_0^l = (D_0^l, C_0^l) \qquad (28c)$$

$$G_0^l = (\overline{D}_0^l, C_0^l) \qquad (28d)$$

In Equations (28a)-(28d), the two quantities within the brackets are called "abnormality degree components." For example, the quantities $D_0^u$ and $C_0^u$ in Equation (28a) are the abnormality degree components of the upper historical degree of abnormality $G_0^u$. Each abnormality degree component of an upper or a lower historical degree of abnormality is a numerical value. For example, the quantities $D_0^u$ and $C_0^u$ in Equation (28a) are numerical values.

The follow description presents a method for determining an abnormality degree component $S_0$ based on a corresponding set of abnormalities S. In the following description, the set of abnormalities S represents any one or the sets of abnormalities described above with reference to Equations (22)-(25) and the abnormality degree component $S_0$ represents any one of the corresponding abnormality degree components introduced in Equations (28a)-(28d). For example, the set S may represent the set of historical upper-threshold event distances $D^u$ represented by Equation (12) and $S_0$ may represent the corresponding abnormality degree component $D_0^u$. The abnormality degree component $S_0$ may be computed as the inverse of an empirical cumulative distribution of the set S denoted by $F_{S,emp}^{-1}(s)$. Methods for computing the inverse of the empirical cumulative distribution for the set S are now described. It should be noted that although in the following description only one method is described for determining abnormality degree component $S_0$, other methods may be used to determine an abnormality degree component $S_0$ based on a corresponding set of abnormalities S. For example, an abnormality degree component $S_0$ of the set S may be determined based on hard or dynamic thresholds for S. In the case of dynamic thresholds, the abnormality degree component $S_0$ may include cyclical behavior of the set S. In other words, different time segments may have different degrees of abnormalities.

First, a histogram of the values s comprising the set S is computed. The histogram is formed by dividing the range of value s in the set S into L subintervals (i.e., bins). Each subinterval covers a range of values associated with the value s. The fraction of values in each subinterval may be calculated by counting the number of values s in the set S that lie within each subinterval and dividing by the total number of values s in the set S. The fraction of values s calculated for each subinterval is a probability denoted by $v_l$, where $0 \leq v_l \leq 1$ for a subinterval index $l=1, \ldots, L$. The probability $v_l$ associated with the l-th subinterval represents the probability that a randomly selected value s from in the set S lies within the l-th subinterval.

Figure 14:
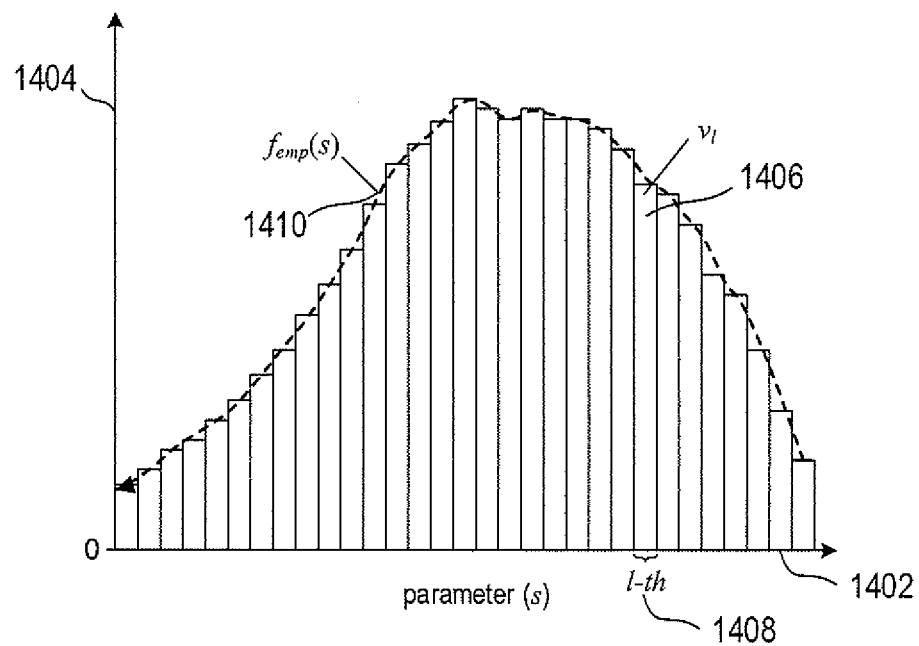
FIG. 14 shows a plot of an example histogram.

FIG. 14 shows a plot of an example histogram of values s in the set S. Horizontal axis 1402 represents a range of values, and vertical axis 1404 represents a range of real numbers greater than 0. Bars represent the probability of values in S lies within subintervals. For example, bar 1406 represent the probability vt that a value s selected from the set S lies in the lth subinterval 1408.

An empirical probability density function is then calculated for the set S based on the histogram. An empirical probability density function denoted by $f_{emp}$ may be interpolated or estimated from the histogram of the set S. The empirical probability density function may be obtained using density estimation of the histogram corresponding to the set S or by fitting a polynomial to the probabilities (i.e., fractions) of the histogram for the set S.

Returning to FIG. 14, a dashed curve 1410 that passes through the probabilities $v_l$ represented by the bars represents an interpolated empirical probability density function $f_{emp}$ that characterizes the probability of the random distribution of values in the set S.

An empirical cumulative distribution $F_{S,emp}$ associated with the set S is calculated from the corresponding empirical probability density function $f_{emp}$. The empirical cumulative distribution $F_{S,emp}$ represents the probability that a randomly selected value in the set S will have a value less than or equal to a particular value s. An empirical cumulative distribution $F_{S,emp}$ may be represented mathematically as the integral of an empirical probability density function $f_{emp}$ as follows:

$$F_{S,emp}(s) = \int_0^s du f_{emp}(u) \qquad (29)$$

where s represents a value along the axis 1402 in FIG. 14. An empirical cumulative distribution $F_{S,emp}$ may be calculated from a probability density function $f_{emp}$ using any one of many different numerical integration techniques. Alternatively, an empirical cumulative distribution $F_{S,emp}$ may be calculated as a sum of the probabilities $v_l$ up to and including the lth interval that contains the value s as follows:

$$F_{S,emp}(s) \approx \sum_{l=1}^{l_s} v_l \qquad (30)$$

where $l_s$ is the subinterval that contains the value s.

The abnormality degree component $S_0$ may be determined by computing the inverse of an empirical cumulative distribution as follows:

$$S_0 = F_{S,emp}^{-1}(s_0) \qquad (31)$$

where $0 \leq s_0 \leq 1$ (e.g., $s_0 = 0.7$).
For example, the lower-threshold estimated historical degree of abnormality of Equation (28c) is given by $$G_0^l = (D_0^l, C_0^l) = (F_{D^l,emp}^{-1}(s_D), F_{C^l,emp}^{-1}(s_C)) \qquad (32)$$

where
$0 \leq s_D, s_C \leq 1$ (e.g., $s_D = s_C = 0.7$); and
$F_{D^l,emp}^{-1}(s_D)$ is the inverse of the empirical cumulative distribution for the set $D^l$; and
$F_{C^l,emp}^{-1}(s_C)$ is the inverse of the empirical cumulative distribution for the set $C^l$.

In an alternative implementation, a parametric cumulative distribution $F_S$ may be calculated based on the empirical cumulative distribution $F_{S,emp}$ by making an appropriate selection of the parameters of the parametric cumulative distribution $F_S$. For example, the parameters associated with a parametric cumulative distribution $F_S$ may be calculated so that the parametric cumulative distribution $F_S$ approximates the empirical cumulative distribution $F_{S,emp}$.

Figure 15:
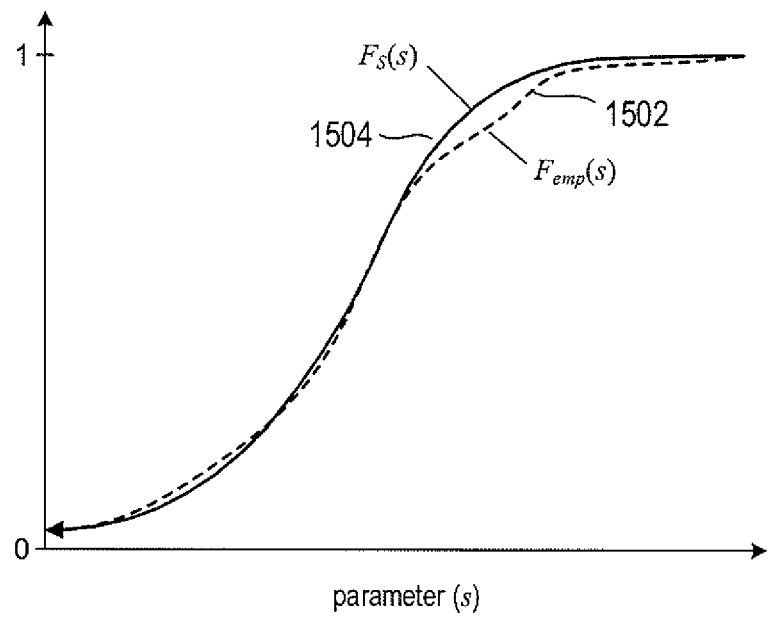
FIG. 15 shows a plot of an empirical cumulative distribution and a corresponding parametric cumulative distribution.

FIG. 15 shows a plot of an empirical cumulative distribution $F_{S,emp}$ represented by dashed curve 1502 and a corresponding parametric cumulative distribution $F_S$ represented by solid curve 1504. The parametric cumulative distribution $F_S$ 1504 may be obtained by calculating the parametric cumulative distribution parameters as a best fit to the empirical cumulative distribution $F_{S,emp}$.

Examples of other parametric cumulative distributions that may to be used includes a generalized Pareto ("GP") distribution and a generalized extreme value ("GEV") distribution. The GP distribution is given by:

$$F_s(s) = 1 - \left(1 - \frac{\gamma s}{\sigma}\right)^{\frac{1}{\gamma}} \qquad (33)$$

for $\lambda \neq 0$ and $\sigma > 0$; and $$F_s(s) = 1 - e^{-\frac{s}{\sigma}} \qquad (34)$$

for $\lambda = 0$ and $\sigma > 0$,
where $s \geq 0$ if $\gamma \leq 0$; and $$0 \leq s \leq \frac{\sigma}{\gamma} \text{ if } \gamma > 0.$$

The parameters $\gamma$ and $\sigma$ of the GP distribution are determined as a best fit to an empirical cumulative distribution $F_{S,emp}$. The GEV distribution is given by:

$$F_s(s) = \exp\left\{-\left[1 + \xi\left(\frac{s-\mu}{\sigma}\right)\right]^{-\frac{1}{\xi}}\right\} \qquad (35)$$

for $$1 + \xi\left(\frac{s-\mu}{\sigma}\right) > 0,$$

where $\xi \neq 0$ is the shape parameter, p is a location parameter, and $\sigma > 0$; and $$F_s(s) = \exp\left\{-\exp\left(-\frac{s-\mu}{\sigma}\right)\right\} \qquad (36)$$

for $\xi = 0$.
The parameters $\mu$, $\sigma$, $\xi$ of the GEV distribution are determined as a best fit to the empirical cumulative distribution $F_{S,emp}$.

The abnormality level component $S_0$ may be given by the inverse of a parameter cumulative distribution as follows:

$$S_0 = F_S^{-1}(s_0) \qquad (37)$$

where $0 \leq s_0 \leq 1$ (e.g., $s_0 = 0.7$).
For example, the upper-threshold estimated historical degree of abnormality of Equation (28a) is given by $$G_0^u = (D_0^u, C_0^u) = (F_{D^u}^{-1}(s_D), F_{C^u}^{-1}(s_C)) \qquad (38)$$

where
$0 \leq s_D, s_C \leq 1$ (e.g., $s_D = s_C = 0.7$); and
$F_{D^u}^{-1}(s_D)$ is the inverse of a parametric cumulative distributions for the set $D^u$; and
$F_{C^u}^{-1}(s_C)$ is the inverse of a parametric cumulative distributions for the set $C^u$.

When a current threshold violation (i.e., normalcy bound violation) occurs, a number of additional current violations may be allowed to accumulate in order to determine whether or not the violations constitute an event that needs attention. Consider a sequence of a current threshold violations represented by $$d_{M+1}, d_{M+2}, \ldots, d_{M+\alpha} \qquad (39)$$

where the distance $d_{M+\alpha}$ is the current violation of a threshold.

A current distance metric is computed for the current event as follows:

$$d^{run-time} = \varphi(d_{M+1}, d_{M+2}, \ldots, d_{M+\alpha}) \quad (40)$$

where $\varphi$ is the mean, median, or maximum.

An estimated current degree of abnormality may be given by $$G^{run-time} = (d^{run-time}, c) \quad (41)$$

where c is the time stamp count of the current event.

Alternatively, the estimated current degree of abnormality may be given by $$G^{run-time} = (d^{run-time}, T^{run-time}) \quad (42)$$

where $T^{run-time}$ is the current duration of the current event.

Figure 16:
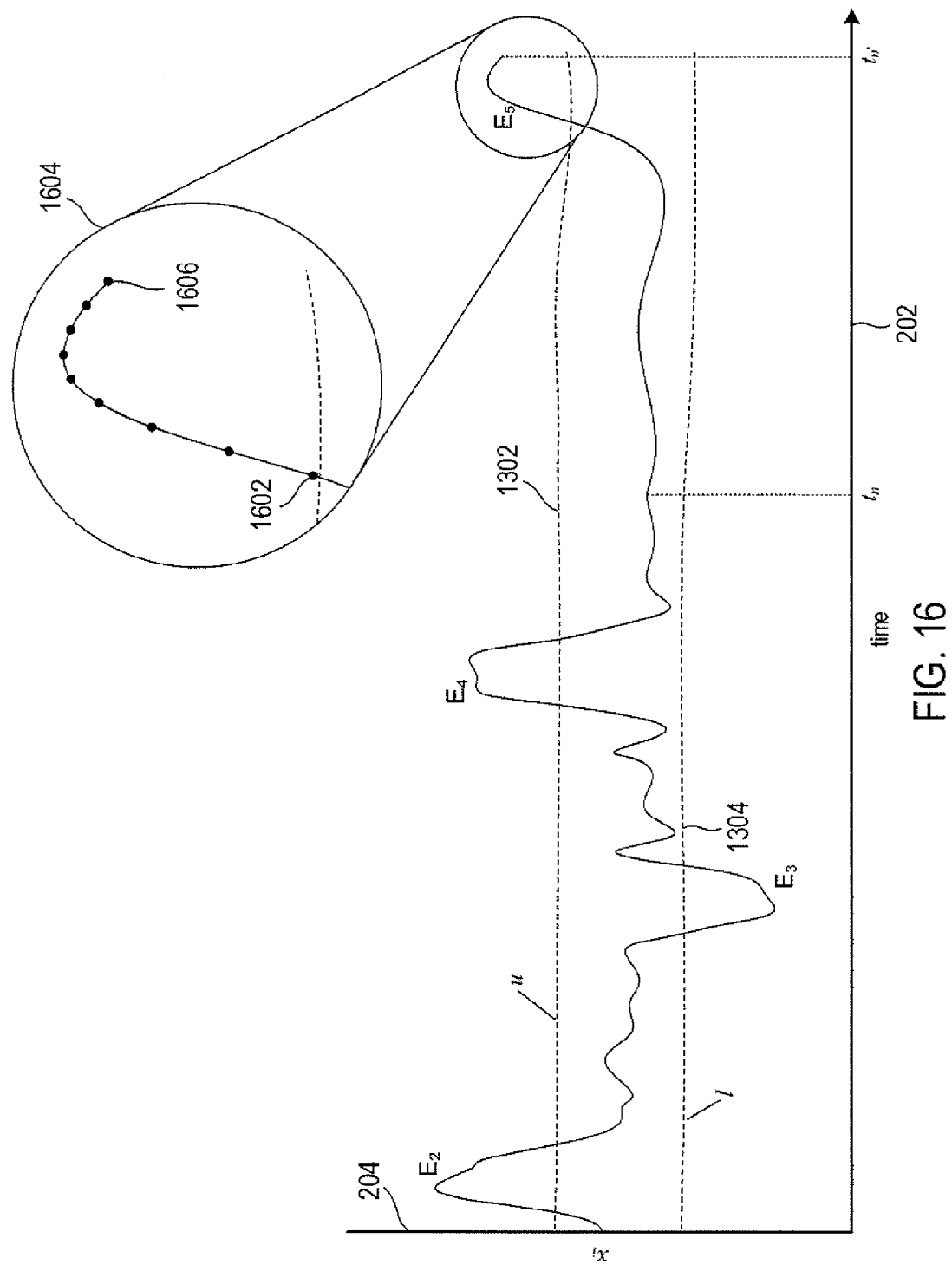
FIG. 16 shows a plot of current metric data generated after the historical set of metric data shown in FIG. 13.

FIG. 16 shows a plot of current data generated after the historical time-series data shown in FIG. 13. Time stamp $t_n$ identifies the final time stamp of the historical time-series data. As shown FIG. 16, current data collected after the time stamp $t_n$ includes an upper-threshold event $E_5$. When a threshold violation occurs at data value 1602 in magnified view 1604 of upper-threshold event $E_5$, eight additional metric values are allowed to accumulate, where data value 1606 represents the most recently generated metric value.

When a current distance metric $d^{run-time}$ is greater than the abnormality degree component $D_0^u$ or $D_0^l$ and/or a current time stamp count c is greater than $C_0^u$ or $C_0^l$, the current normalcy bound violation is considered an event worth of an alert and attention by IT managers is stored in the event container 116 of FIG. 1. Consider, for example, the following pseudo-code representation of determining whether certain threshold violations with a current degree of abnormality $G^{run-time}$ is an event:

```
1    compute G_0^u = (D_0^u, C_0^u);
2    compute G_0^l = (D_0^l, C_0^l);
3    compute G^run-time = (d^run-time, c);
4    if (G^run-time corresponds to an upper-threshold event) {
5        if (d^run-time > D_0^u and c > C_0^u) {   // event is worthy of attention
6            store in event container;
7            return;
8        }
9    }
10   if (G^run-time corresponds to a lower-threshold event) {
11       if (d^run-time > D_0^l and c > C_0^l) {   // event is worthy of attention
12           store in event container;
13           return;
```

In an alternative implementation, rather than comparing both current abnormality degree components with historical abnormality degree components, a single metric based on the abnormality degree components may be used. Consider a single-valued metric of the form $f(x,y)$, where x and y are abnormality degree components of an estimated historical degree of abnormality. For example, the metric may be a product to the abnormality degree components $f(x,y)=xy$ or a linear combination of the abnormality degree components $f(x,y)=ax+by$, where a and b are weights assigned to the components. An abnormality threshold may also be defined by $f(x_0, y_0)$ and compared with a current metric $f(x^{run-time}, y^{run-time})$. When $f(x^{run-time}, y^{run-time}) > f(x_0, y_0)$, the event is worthy of an alert and attention by IT managers and is stored in the event container 116 of FIG. 1.

Consider, for example, the following pseudo-code representation of determining whether certain threshold violations with a current degree of abnormality $G^{run-time}$ is an event:

```
1    compute G_0^u = (D_0^u, C_0^u);
2    compute G_0^l = (D_0^l, C_0^l);
3    compute G^run-time = (d^run-time, c);
4    if (G^run-time corresponds to an upper-threshold event) {
5        f (d^run-time, c);
6        f (D_0^u, C_0^u);
7        if (f (d^run-time, c) > f (D_0^u, C_0^u)) {   // event is worthy of attention
8            store in event container;
9            return;
10       }
11   }
12   if (G^run-time corresponds to a lower-threshold event) {
13       f (d^run-time, c);
14       f (D_0^l, C_0^l);
15       if (f (d^run-time, c) > f (D_0^l, C_0^l)) {   // event is worthy of attention
16           store in event container;
17           return;
18       }
19   }
```

In alternative implementations, the estimated historical degree of abnormality given by Equations (28b) and (28d) may be used. In still other implementations, rather than computing estimated historical degrees of abnormality, constant thresholds may be used instead. For example, rather than computing $D_0^u$ and $C_0^u$ as described above, $D_0^u$ and $C_0^u$ may both be assigned a constant numerical value in $0 \leq D_0^u$, $C_0^u \leq 1$, such as 0.9.

Alteration Inspection Module

The alteration inspection module 103 of FIG. 1 identifies sets of metric data for which normalcy bounds should be re-computed. If a set of metric data shows little variation from historical behavior, then there may be no need to re-compute normalcy bounds. On the other hand, determining a time to recalculate normalcy bounds in the case of global or local changes and postponing recalculation for conservative data often decreases complexity and resource consumption and minimizes the number of false alarms and improves accuracy of recommendations.

The alteration inspection module 103 compares normal characteristics of a historical set of metric data with the characteristics calculated for a current time period. The module 103 computes a data-to-threshold ("DTT") alteration degree of the interdependence between a set of metric data and the associated normalcy bounds, which may be used to decide whether or not the normalcy bounds should be recalculated.

A DT alteration degree may be computed as follows:

$$g(P, S) = e^{-a(1-P)} \frac{S}{S_{max}} \quad (43)$$

where
- $a > 0$ is a sensitivity parameter (e.g., $a=10$);
- P is a percentage or fraction of current time-series data values that lie between upper and lower thresholds over a current time interval $[t_{min}, t_{max}]$;
- $S_{max}$ is the area of a region defined by an upper threshold, u, and a lower threshold, l, and the current time interval $[t_{min}, t_{max}]$; and S is the square of the area between metric values within the region and the lower threshold.

The DTT alteration degree has the property that $0 \leq g(P,S) \leq 1$. The DTT alteration degree may be computed for dynamic or hard thresholds.

When the upper and lower thresholds are hard thresholds, an area of a region, $S_{max}$, is computed as follows:

$$S_{max} = (t_{max} - t_{min})(u - l) \qquad (44)$$

An approximate square of the area, S, between metric values in the region and a hard lower threshold may be computed as follows:

$$S = \frac{1}{2} \sum_{k=1}^{M-1} (x_{k+1} + x_k - 2l)(t_{k+1} - t_k) \qquad (45)$$

where
- M is the number metric values with time stamps in the time interval $[t_{min}, t_{max}]$;
- $t_{min} = t_1$; and
- $t_{max} = t_M$.

Figure 17:
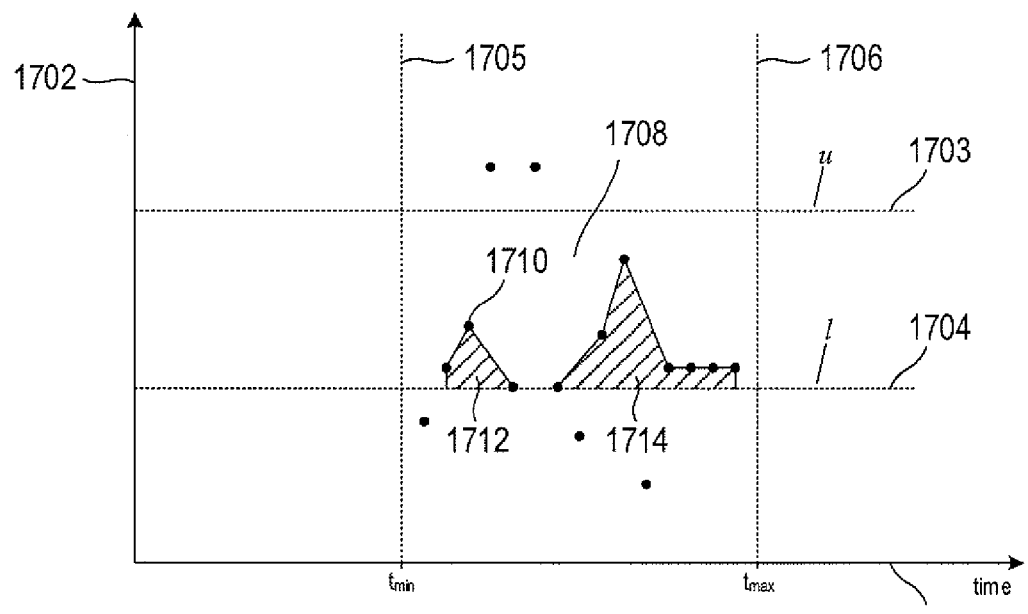
FIG. 17 shows an example of time-series data within a region defined by hard upper and lower thresholds and a time interval.

FIG. 17 shows an example of current time-series data within a region defined by hard upper and lower thresholds and a current time interval $[t_{min}, t_{max}]$. Horizontal axis 1701 represents time and vertical axis 1702 represent a range of metric values. Dashed line 1703 represents an upper threshold, u, and dashed line 1704 represents a lower thresholds, l. Dashed line 1705 represents time $t_{min}$ and dashed line 1706 represents time $t_{max}$. The upper and lower thresholds and the current time interval define a rectangular region 1708. Solid dots, such as solid dot 1710, represent metric values with time stamps in the current time interval. In this example, the percentage of current time-series data in the region 1708 is 66.7%. The area of the rectangular region $S_{max}$ is computed according to Equation (44). Shaded areas 1712 and 1714 represent areas between metric values in the region 1708 and the lower threshold 1704. An approximate square of the areas 1712 and 1714 may be computed according to Equation (45).

When the upper and lower thresholds are dynamic thresholds, an approximate area of the region, $S_{max}$, defined by the dynamic upper and lower thresholds and the time interval may be computed as follows:

$$S_{max} = \sum_{k=1}^{M-1} (u_{k+1} - l_{k+1})(t_{k+1} - t_k) \qquad (46)$$

An approximate square of an area, S, between metric values in the region and a dynamic lower threshold may be computed as follows:

$$S = \frac{1}{2} \sum_{k=1}^{M-1} ((x_{k+1} - l_{k+1}) + (x_k - l_k))(t_{k+1} - t_k) \qquad (47)$$

Figure 18:
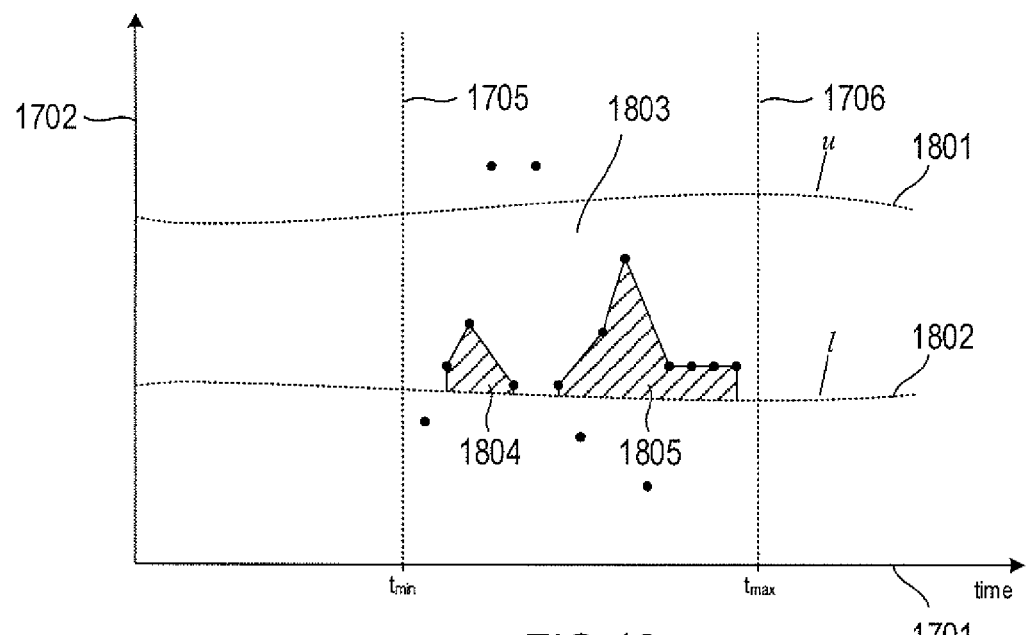
FIG. 18 shows an example of time-series data within a region defined by dynamic upper and lower thresholds and a time interval.

FIG. 18 shows the example current time-series data of FIG. 17 within a region defined by dynamic upper and lower thresholds and the same time interval $[t_{min}, t_{max}]$. FIG. 18 is similar to FIG. 17 except the hard upper and lower thresholds of FIG. 17 have been replaced by dynamic upper and lower thresholds 1801 and 1802, respectively. The approximate area $S_{max}$ of a region 1803 defined by the upper and lower thresholds and the time interval is computed according to Equation (46). Shaded areas 1804 and 1805 represent areas between metric values in the region 1803 and the dynamic lower threshold 1802. An approximate square of the areas 1804 and 1805 may be computed according to Equation (47).

The DTT alteration degree is computed for a current time interval and compared with a previously computed DTT alteration degree for the same metric but for an earlier time interval. When the following condition is satisfied, the thresholds for the metric are re-computed:

$$|g^{cur}(P,S) - g^{pre}(P,S)| > \epsilon_g \qquad (48)$$

where
- $g^{cur}(P,S)$ is a DTT alteration degree computed for current time interval;
- $g^{pre}(P,S)$ is a previously computed DTT alteration degree computed for a previous time interval; and
- $\epsilon_g$ is an alteration threshold (e.g., $\epsilon_g = 0.1$).

When the condition represented by Equation (48) is not satisfied, the thresholds for the metric are unchanged. The thresholds may be recomputed using the normalcy analysis module 102 of FIG. 1.

Figure 19:
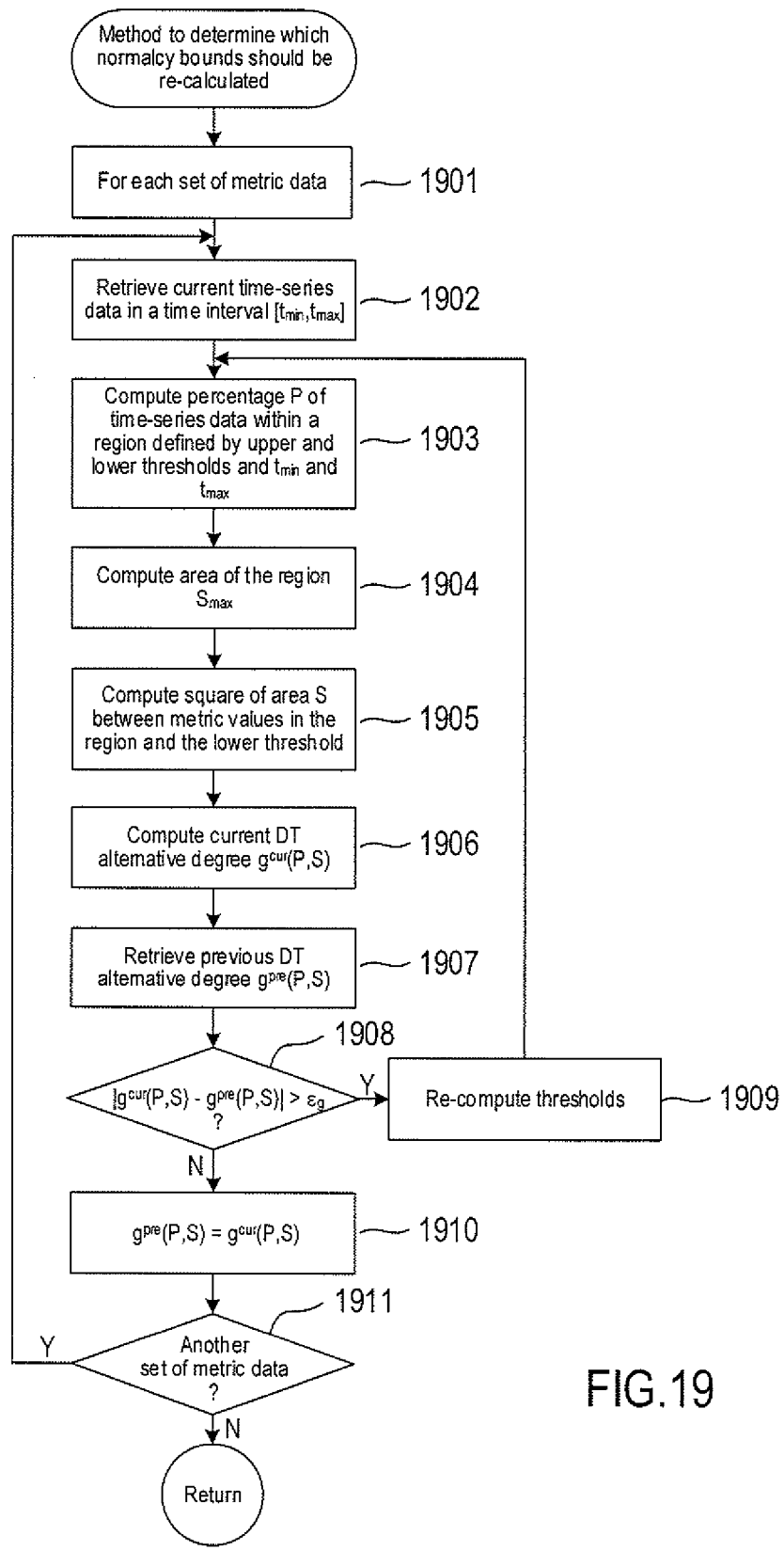
FIG. 19 shows a flow-control diagram of a method to determine which normalcy bounds should be re-calculated.

FIG. 19 shows a flow-control diagram of a method to determine which normalcy bounds should be re-calculated executed by the alteration inspection module 103 of FIG. 1. A for-loop beginning with block 1901 repeats the operations represented by blocks 1902-1911 for each set of metric data in the monitoring data container 114 of FIG. 1. In block 1902, current time-series data with time stamps in a current time interval $[t_{min}, t_{max}]$ are retrieved from a data-storage device. In block 1903, a percentage of metric values that lie within a region defined by the upper and lower thresholds and the time interval $[t_{min}, t_{max}]$ is computed as described above with reference to FIGS. 17 and 18. In block 1904, the area $S_{max}$ of the region bounded by the upper and lower thresholds and the time interval $[t_{min}, t_{max}]$ is computed. When the thresholds are hard thresholds, the area may be computed according to Equation (44). When the thresholds are dynamic thresholds, the area may be computed according to Equation (46). In block 1905, the square area of between the metric values in the region and the lower threshold are computed. When the lower threshold is a hard threshold, the square of the area may be computed according to Equation (45). When the lower threshold is a dynamic threshold, the square of area may be computed according to Equation (47). In block 1907, a DTT alteration degree $g^{cur}(P,S)$ of the current time interval is computed based on the values obtained in blocks 1903-1905 according to Equation (43). In block 1907, a previous DTT alteration degree $g^{pre}(P,S)$ computed for a previous time interval is retrieved from data storage.

In decision block 1908, when the condition represented by Equation (48) is satisfied, control flows to block 1909 and the thresholds are recomputed using the normalcy analysis module 102 of FIG. 1. Otherwise, control flows to block 1910, and the DTT alteration degree $g^{pre}(P,S)$ is assigned the value of the DTT alteration degree $g^{cur}(P,S)$. In decision block 1911, the operations represented by blocks 1902-1910 are repeated for another set of metric data.

Alert Reduction Module

The alert reduction module 105 of FIG. 1 deletes and/or stops collecting sets of metric data with no events and deletes sets of metric data with correlated events.

Alternatively, the rate at which such sets of metric data are stored may be lowered in order to conserve storage space and threshold recalculation by alteration inspection module 103 may be postponed. On the other hand, certain sets of metric data that do not have events may still provide useful information about the cloud-computing infrastructure or an enterprise's applications, leading to proactive actions towards optimizations and infrastructure reorganizations.

The alert reduction module 105 may include calculation of an event rate for each set of metric data stored in the event data container 116. The event rate of a set of metric data, denoted by $E_{rate}$, is the number of events that occur over a period of time. When the event rate is less than an event-rate threshold, (e.g., less than 5 events in a 3 month period), the set of metric data may be deleted. Alternatively, the events may be rated by root cause and black swan analyses module 106 described below in order to give high rates to metrics with impactful events.

For sets of metric data with a number of events greater than the event-rate threshold, the alert reduction module 105 reduces the number of events in the event data container 116 based on event correlation. The alert reduction module 105 is based on normalcy bounds assigned to a set of metric data $x^{(i)}(t)$ and at each time stamp $t_s$ threshold violation may be determined, and in case of sequential threshold violations, a duration or number of sequential violated metric values may be determined. A set of metric data $x^{(i)}(t)$ is transformed to a set of anomaly metric data as follows:

$$a^{(i)}(t_s) = \begin{cases} 0 & \text{for } l_s \leq x^{(i)}(t_s) \leq u_s \\ x^{(i)}(t_s) - u_s & \text{for } x^{(i)}(t_s) > u_s \\ l_s - x^{(i)}(t_s) & \text{for } x^{(i)}(t_s) < l_s \end{cases} \quad (49)$$

In an alternative implementation, a cumulative sum of the anomaly metric values may be calculate as follows:

$$s^{(i)}(t_s) = \sum_{t}^{t_s} a^{(i)}(t) \quad (50)$$

where t is an event time stamp.

Figure 20A:
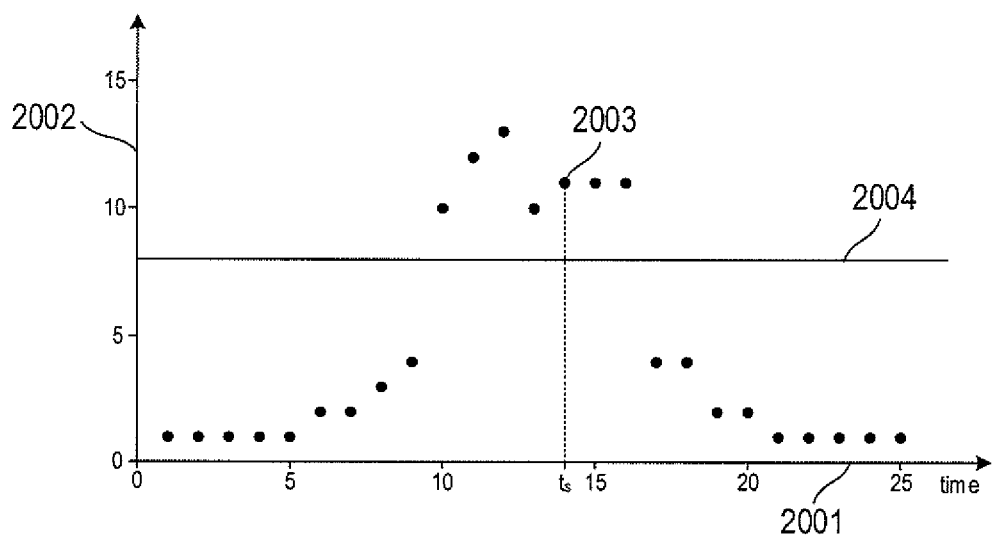
FIGS. 20A-20C show plots an example of a set of metric data, a set of anomaly metric data, and a cumulative sum of anomaly metric data associated with an event.
Figure 20B:
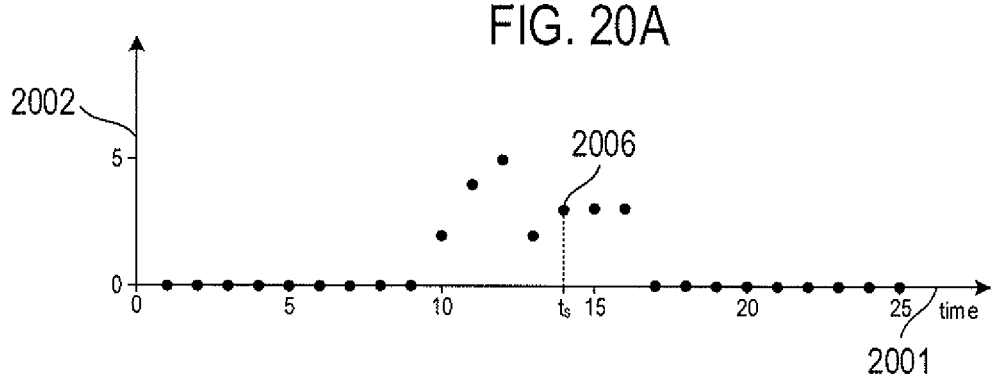
Figure 20C:
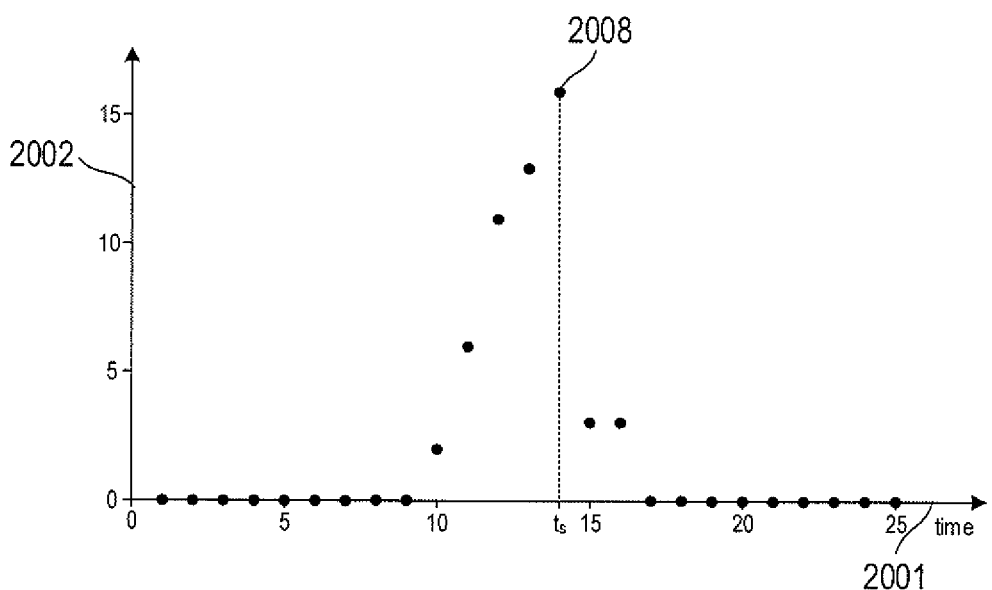

FIGS. 20A-20C show plots an example set of metric data, a set of anomaly metric data, and a cumulative sum of anomaly metric data associated with an event. Horizontal axis 2001 represents time and vertical axis 2002 represents a range of metric values. Solid dots, such as solid dot 2003, represent a set of metric data. FIG. 20A shows the set of metric data with seven metric values that violate an upper threshold 2004 to form an event. FIG. 20B shows a set of anomaly metric data with zero values that corresponding to the metric data that does not violate the upper threshold in FIG. 20A and positive valued anomaly metric values that correspond to the metric data greater than the threshold determined according to Equation (49). For example, anomaly metric value 2006 is the distance of the metric value 2003 above the threshold 2004 at time stamp $t_S$. FIG. 20C shows a cumulative sum of the anomaly metric data up to the time stamp $t_S$. For example, cumulative sum metric value 2008 is computed as the sum of the anomaly metric values in FIG. 20B up to and including the anomaly metric value 2006 at the time stamp $t_S$.

A correlation matrix is then computed for one of the set of anomaly metric values $\{a^{(i)}(t)\}_{i=1}^{N}$, and the set of cumulative sum anomaly metric values $\{s^{(i)}(t)\}_{i=1}^{N}$ as described above with reference Equation (6). FIG. 21 shows an example of a correlation matrix for the set of anomaly metric values $\{a^{(i)}(t)\}_{i=1}^{N}$. Each element of the correlation matrix in FIG. 21 may be computed using Equation (6).

The eigenvalues of the correlation matrix are computed, ordered from largest to smallest as described above with reference to Equation (7), and a numerical rank m of the correlation matrix is determined from the eigenvalues based on a tolerance $0 < \tau \leq 1$, as described above with reference to Equations (8a)-(8b). Depending on the whether the correlation matrix has been computed for the set of metric data $\{x^{(i)}(t)\}_{i=1}^{N}$, the set of anomaly metric values $\{x^{(i)}(t)\}_{i=1}^{N}$, or the set of cumulative sum anomaly metric values $\{s^{(i)}(t)\}_{i=1}^{N}$, the numerical rank m indicates the number of independent sets of metric data (i.e., independent events).

Given the numerical rank m, the m independent sets of metric data may be determined using QR decomposition of the correlation matrix. In particular, the m independent sets of metric data are determined based on the m largest diagonal elements of the R matrix obtained from QR decomposition.

FIG. 22 shows the correlation matrix of FIG. 21 after QR decomposition. The N columns of the correlation matrix shown in FIG. 21 are denoted by $A_1, A_2, \ldots, A_N$, N columns of the Q matrix are denoted by $\hat{Q}_1, \hat{Q}_2, \ldots, \hat{Q}_N$, and N diagonal elements of the R matrix are denoted by $\hat{r}_{11}, \hat{r}_{22}, \ldots, \hat{r}_{NN}$. The columns of the Q matrix are determined based on the columns of the correlation matrix as follows:

$$\hat{Q}_i = \frac{V_i}{\|V_i\|} \quad (51a)$$

where
$\|A_i\|$ denotes the length of a vector $A_i$; and
the vectors $V_i$ are calculated according to $$V_1 = A_1 \quad (51b)$$

$$V_i = A_i - \sum_{j=1}^{i-1} \frac{\langle \hat{Q}_j, A_j \rangle}{\langle \hat{Q}_j, \hat{Q}_j \rangle} \hat{Q}_j \quad (51c)$$

where $\langle \cdot, \cdot \rangle$ denotes the scalar product.
The diagonal matrix elements of the R matrix are given by $$\hat{r}_{ii} = \langle \hat{Q}_i, A_i \rangle \quad (51d)$$

In this example, the sets of anomaly metric data that correspond to the largest m (i.e., numerical rank) diagonal elements of the R matrix are selected. The remaining sets of anomaly metric data may be deleted from the event data container 116.

Figure 23:
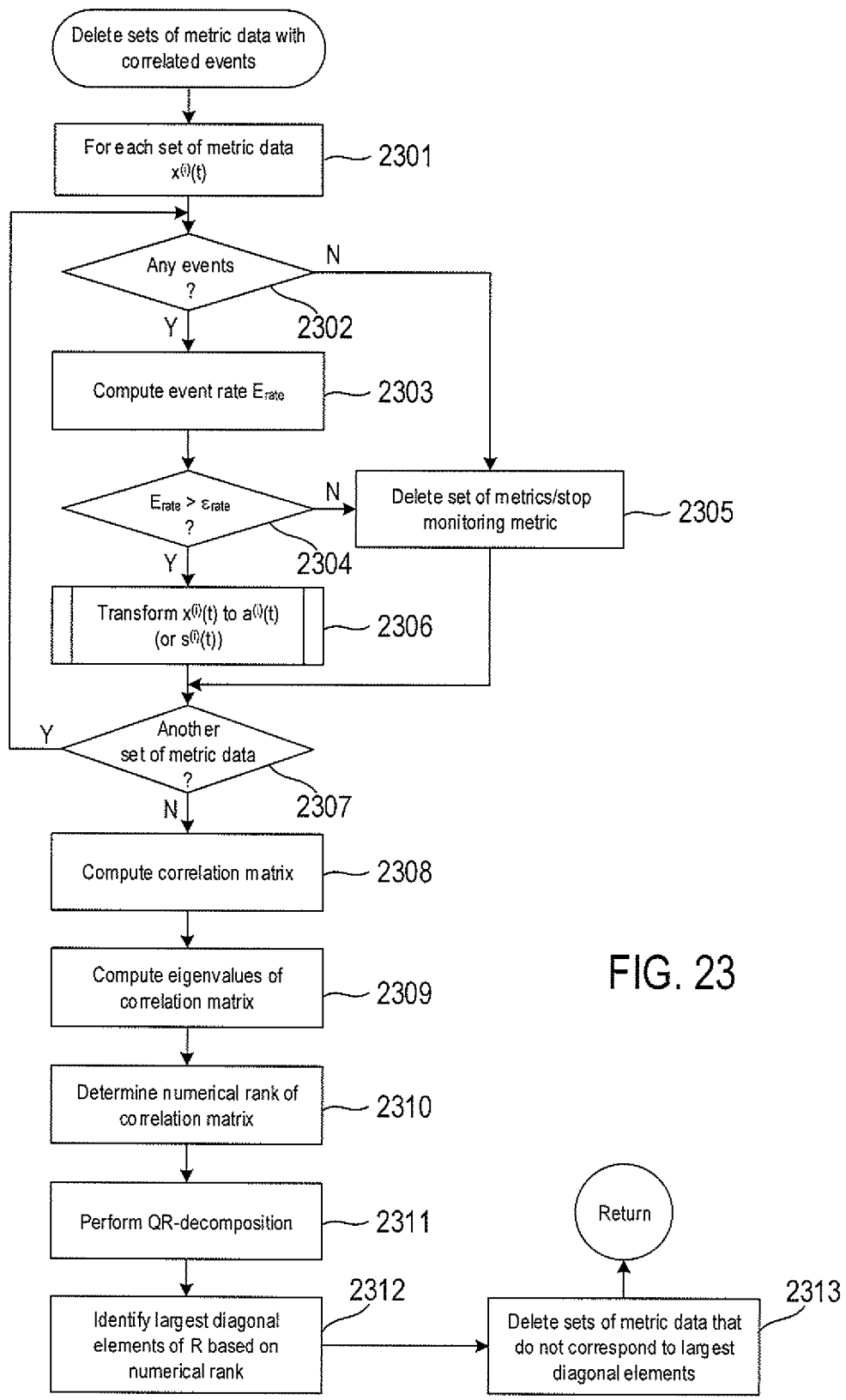
FIG. 23 shows a flow-control diagram of a method to delete sets of metric data with correlated events.

FIG. 23 shows a flow-control diagram of a method to delete sets of metric data with correlated events. A for-loop beginning with block 2301 repeats the operations represented by blocks 2302-2307 for each set of metric data stored in the event data container 116 of FIG. 1. In decision block 2302, when a set of metric data has threshold violation events, control flows to block 2303. Otherwise, the set of metric data has no events, control flows to block 2305. In block 2303, an event rate $E_{rate}$, is compute for the set of metric data as a count of the number of events that occurred over a period of time. In decision block 2304, when the event rate $E_{rate}$ is less than an event-rate threshold $\epsilon_{rate}$, control flows to block 2305. Otherwise, when the event rate $E_{rate}$ is greater than the event-rate threshold $\epsilon_{rate}$, control flows to block 2306. In this example, in block 2305, the set of metric data is deleted from the event data container 116. In block 2306, a routine "transform set of metric data to set of anomaly metric data" is called to perform the transformation represented by Equation (49). In decision block 2307, the operations represented by blocks 2302-2306 are repeated for another set of metric data stored in the event data container 106. In block 2308, matrix elements of a correlation matrix are computed as described above with reference to FIG. 21 and Equation (6). In block 2309, eigenvalues of the correlation matrix determined block 2308 are determined. In block 2310, a numerical rank m of the correlation matrix is determined based on the eigenvalues and tolerance as described above with reference to Equations (8a) and (8b). In block 2311, the process of QR decomposition is applied to the correlation matrix to determine the diagonal elements of a matrix as described above with reference to FIG. 7 and Equations (51a)-(51d). In block 2312, the m largest diagonal elements of the matrix R are used to identify corresponding time-series data. In block 2313, time-series data that does not correspond to the m largest diagonal elements of the matrix R are deleted from the event data container 116.

Figure 24:
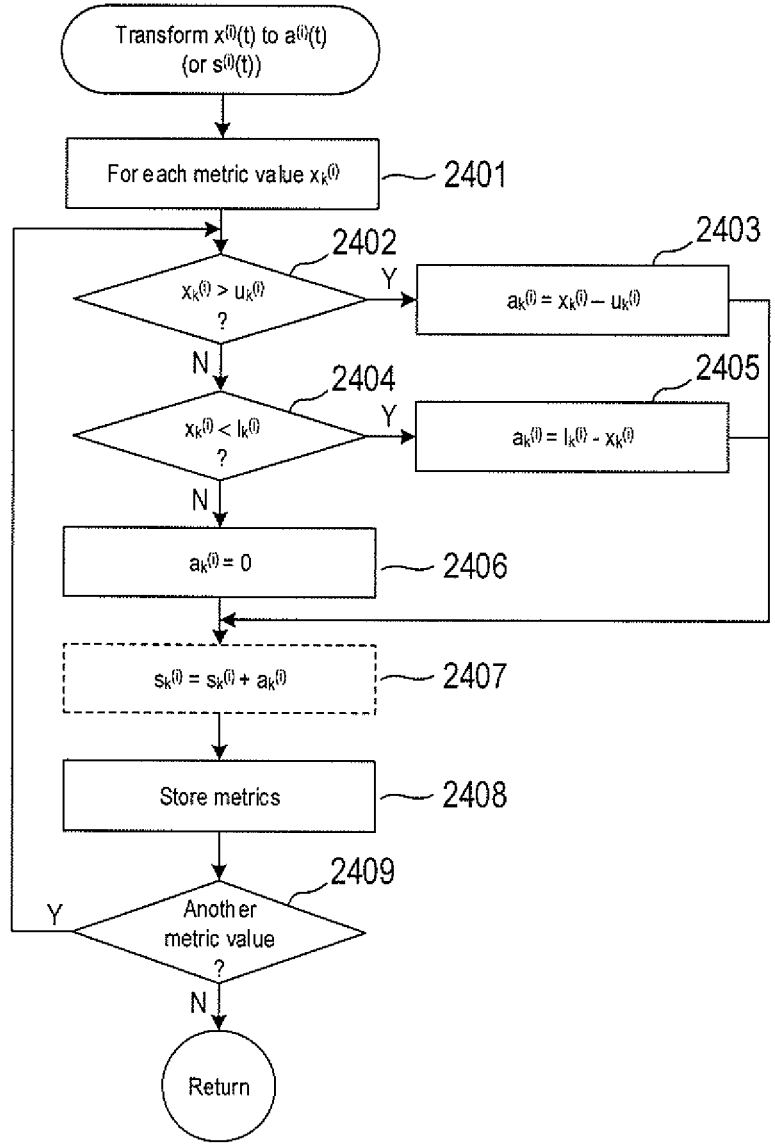
FIG. 24 shows a flow-control diagram of the routine "transform set of metric data to set of anomaly metric data" called in FIG. 23.

FIG. 24 shows a flow-control diagram of the routine "transform set of metric data to set of anomaly metric data" called in block 2306 of FIG. 23. A for-loop beginning with block 2401 repeats the operations of blocks 2402-2409 for each metric value $x_k^{(i)}$ of the set of metric data. In decision block 2402, when $x_k^{(i)} > u_k^{(i)}$, where $u_k^{(i)}$ is the upper threshold value at time stamp $t_k$, control flow to block 2403. Otherwise, $x_k^{(i)} \leq u_k^{(i)}$ and control flows to decision block 2404. In block 2403, an anomaly metric value is computed as $a_k^{(i)} = x_k^{(i)} - u_k^{(i)}$. In decision block 2404, when $x_k^{(i)} < l_k^{(i)}$ where $l_k^{(i)}$ is the lower threshold value at time stamp $t_k$, control flow to block 2405. Otherwise, $x_k^{(i)} \leq l_k^{(i)}$ and control flows to decision block 2406. In block 2405, an anomaly metric value is computed as $a_k^{(i)} = l_k^{(i)} - x_k^{(i)}$. In block 2406, the anomaly metric value $a_k^{(i)}$ is set equal to zero. In an alternative implementation, when sets of cumulative sums are used instead of sets of anomaly metric data, cumulative sums may be calculated in block 2407, as described above with reference to Equation (50). In block 2408, the set of anomaly metric data (or cumulative sums) are stored in a data-storage device. In decision block 2409, the operations represented by blocks 2402-2408 are repeated for another set of metric data in event data container 116.

FIGS. 25A-27D illustrate an example of the alert detection module 105 applied to four sets of metric data. Two of the four sets of metric data represent user counts and response time of a first application, and the other two of the four sets of metric data represent user counts and response of a second application.

Figure 25A:
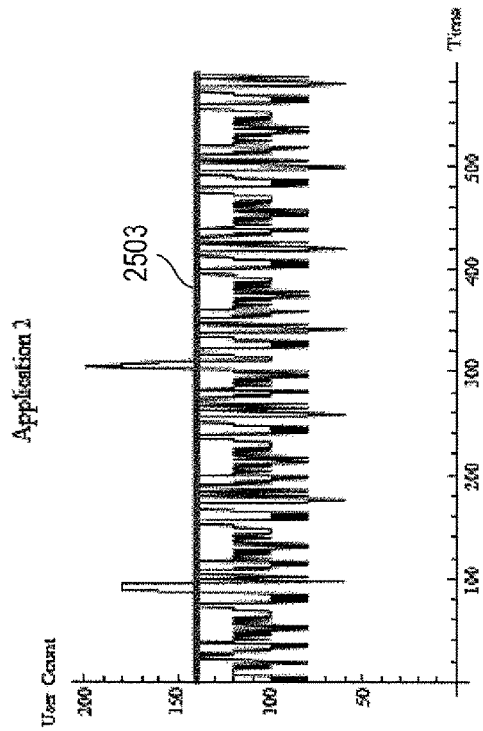
FIGS. 25A-27D are an example of alert detection applied to four sets of metric data.
Figure 25C:
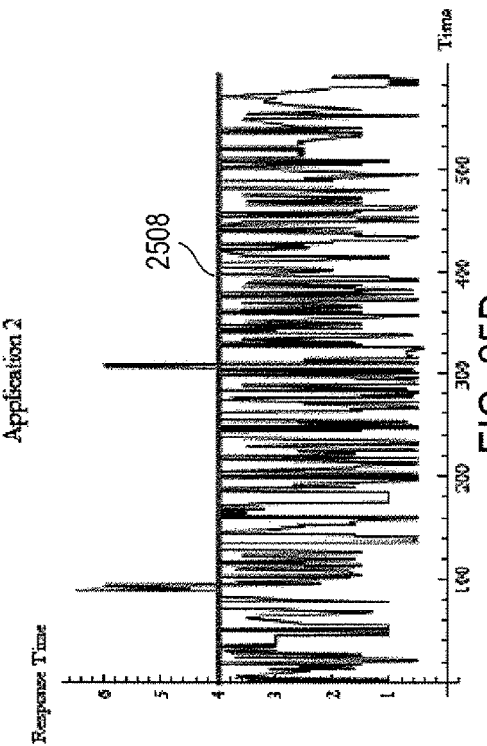
Figure 25B:
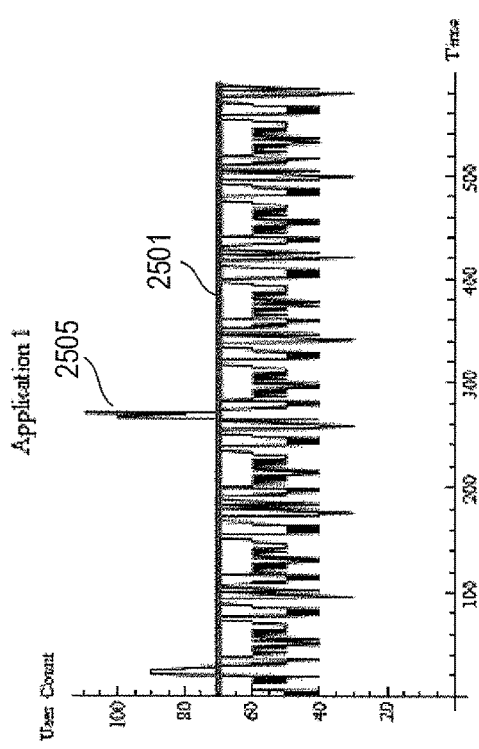
Figure 26A:
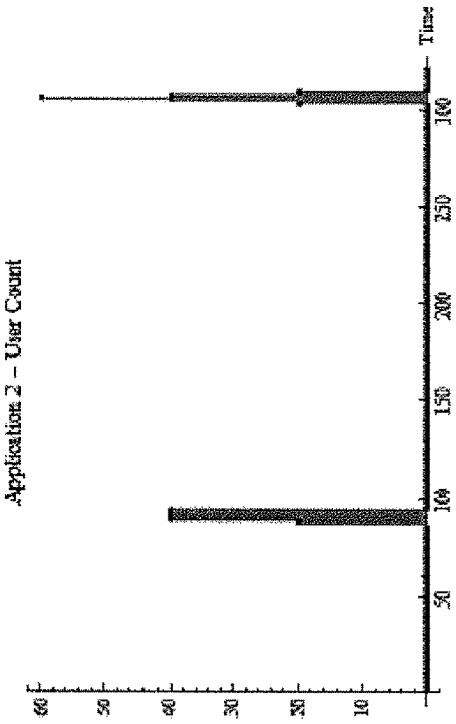
Figure 26B:
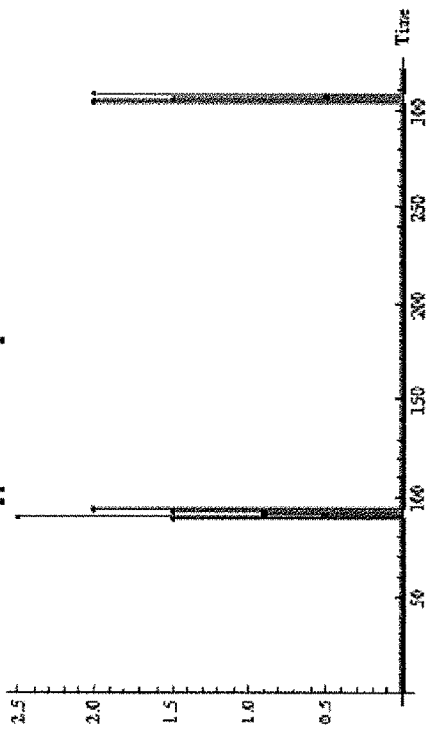
Figure 27A:
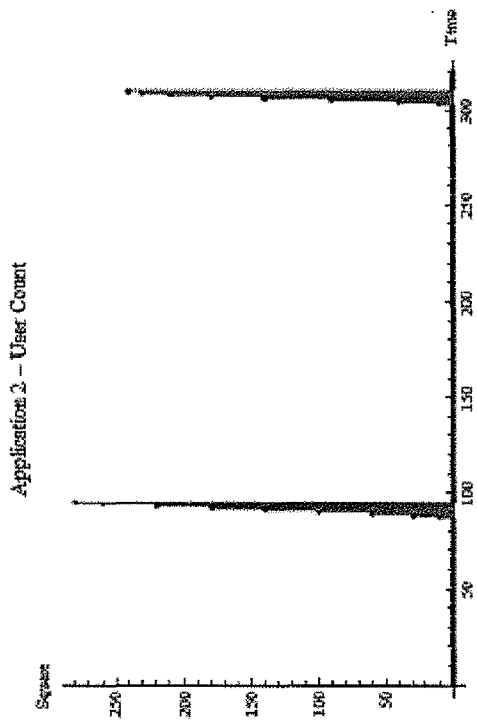
Figure 27C:
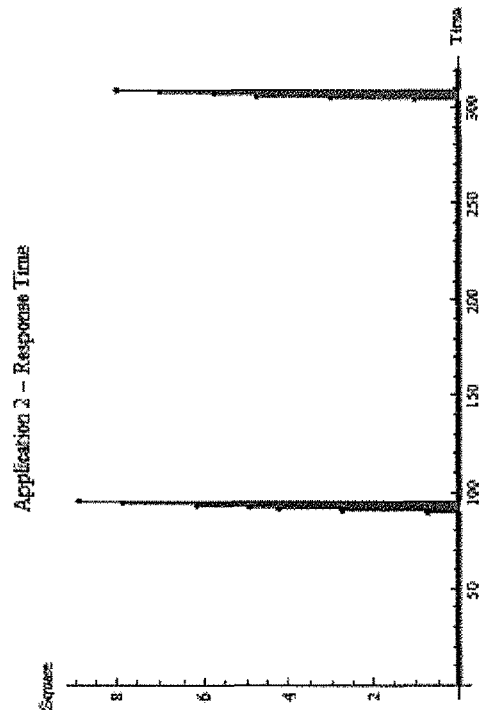
Figure 27B:
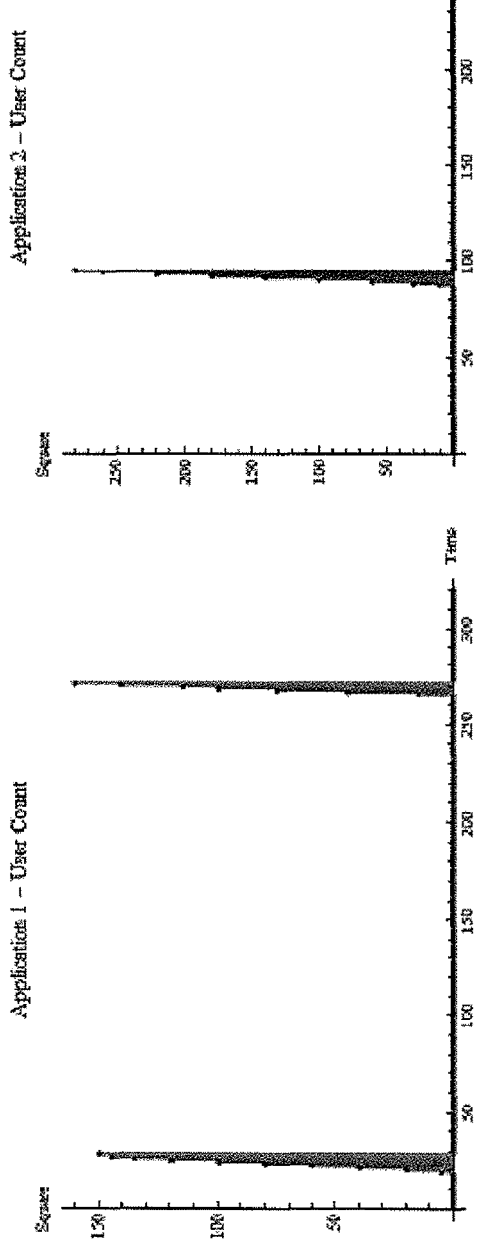

FIGS. 25A-25B show plots of the user counts $x_1(t)$ and response times $x_2(t)$ for the first application, respectively. Line 2501 represents a user-count upper threshold of 70 users for the first application, and line 2502 represents a response-time upper threshold of 4 milliseconds for the first application. Spikes, such as spike 2505, represent events. FIGS. 26A-26B show plots of sets of anomaly metric data $a_1(t)$ and $a_2(t)$ calculated for events shown in FIGS. 25A-25B, respectively. FIGS. 27A-27B show plots of sets of cumulative sums $s_1(t)$ and $s_2(t)$ of the sets of anomaly metric data shown in FIGS. 26A-26B, respectively. However, because the duration of alarms and associated magnitudes are small, sets of metric data $x_1(t)$ and $x_2(t)$ remain uncorrelated with a correlation coefficient $\rho_{x_1,x_2} = 0.091$.

The correlation coefficient of the sets of anomaly metric data $a_1(t)$ and $a_2(t)$ is $\rho_{a_1,a_2} = 0.907$.

The correlation coefficient of the sets of cumulative sums $s_1(t)$ and $s_2(t)$ is $\rho_{s_1,s_2} = 0.904$.

The correlation matrix of sets of metric data $x_1(t)$ and $x_2(t)$ is $$\begin{pmatrix} 1 & 0.091 \\ 0.091 & 1 \end{pmatrix}$$

with eigenvalues $\lambda_1 = 1.091, \lambda_2 = 0.909$

With tolerance $\tau = 0.9$ both sets of metric data $x_1(t)$ and $x_2(t)$ are retained without reduction. On the other hand, performing correlation analysis on the sets of cumulative sums $s_1(t)$ and $s_2(t)$ gives a correlation matrix $$\begin{pmatrix} 1 & 0.904 \\ 0.904 & 1 \end{pmatrix}$$

with eigenvalues $\lambda_1 = 1.904, \lambda_2 = 0.096$.

With tolerance $\tau = 0.9$ one sets of the metric data $x_1(t)$ and $x_2(t)$ is retained. QR decomposition yields the following matrix R $$R = \begin{pmatrix} 1.348 & 1.341 \\ 0 & 0.136 \end{pmatrix}$$

and hence, the set of metric data $x_1(t)$ is sufficient for description of Application 1.

Figure 25D:
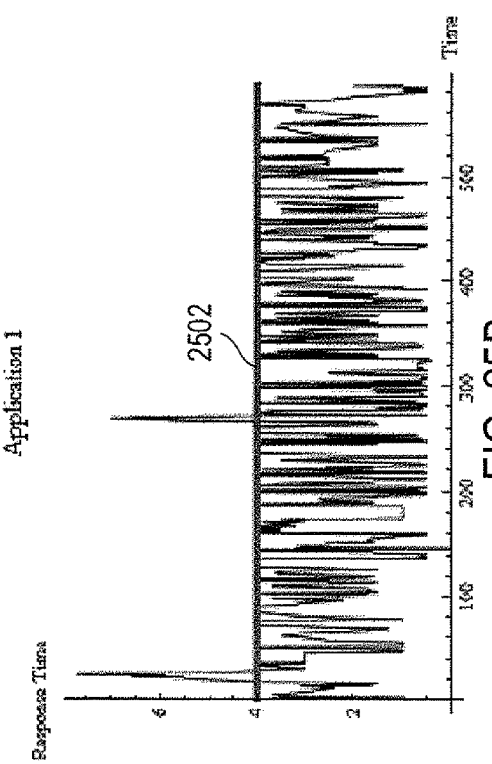
Figure 26C:
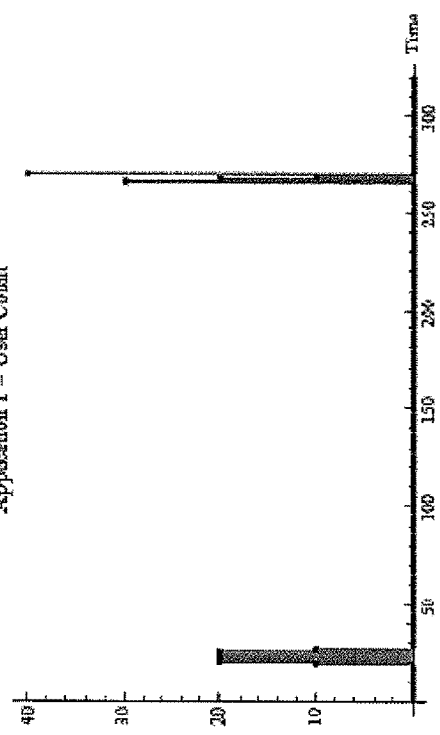
Figure 26D:
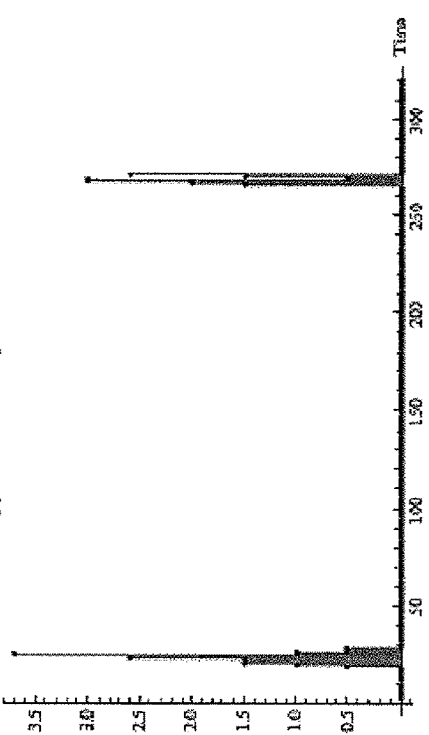
Figure 27D:
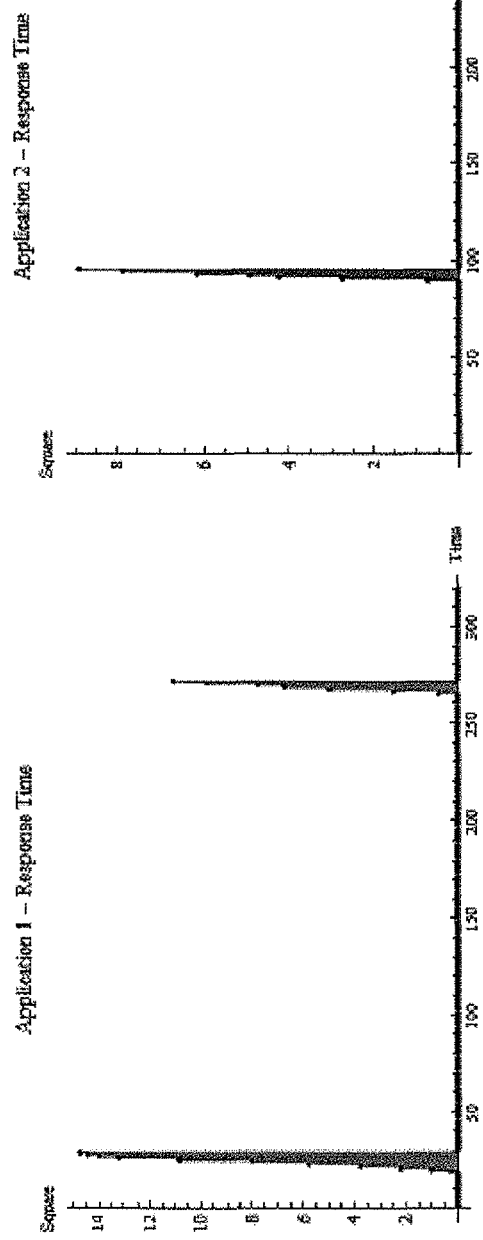

FIGS. 25C-25D show plots of the user counts $x_3(t)$ and response times $x_4(t)$ for the second application, respectively. Line 2503 represents a user-count upper threshold of 140 users for the second application, and line 2504 represents a response-time upper threshold of 4 milliseconds for the second application. FIGS. 26C-26D show plots of the sets of anomaly metric data $a_1(t)$ and $a_2(t)$ calculated for events shown in FIGS. 25C-25D, respectively. FIGS. 27C-27D show plots of the sets of cumulative sums $s_3(t)$ and $s_4(t)$ of the sets of anomaly metric data shown in FIGS. 26C-26D, respectively. Correlation coefficient of the sets of metric data $x_1(t)$ and $x_2(t)$ is $\rho_{x_3,x_4} = 0.0003$ Correlation coefficient of the sets of anomaly metric data $a_1(t)$ and $a_2(t)$ is $\rho_{a_1,a_2} = 0.907$ Correlation coefficient of the sets of cumulative sums $s_3(t)$ and $s_4(t)$ is $\rho_{s_1,s_2} = 0.931$ Correlation analysis applied to $x_3(t)$ and $x_4(t)$ shows no-reduction and correlation analysis applied the sets of cumulative sums $s_3(t)$ and $s_4(t)$ shows that $x_3(t)$ is sufficient for description of Application 2.

When the four sets of metric data associate with the first and second applications are considered together, the sets of metric data are represented by $\{x_k\}_{k=1}^4$ and the correlation matrix is given by $$M_x = \begin{pmatrix} 1 & 0.091 & 0.812 & -0.140 \\ 0.091 & 1 & -0.0999 & 0.785 \\ 0.811 & -0.09999 & 1 & 0.0003 \\ -0.140 & 0.785 & 0.0003 & 1 \end{pmatrix}$$

with eigenvalues $\lambda_1=1.8755, \lambda_2=1.7247, \lambda_3=0.3658, \lambda_4=0.0340.$ The numerical rank of the correlation matrix $M_x$ is 2 and with a tolerance $$\tau = 0.9, \frac{\lambda_1}{4} = 0.47 \text{ and } \frac{\lambda_1 + \lambda_2}{4} = 0.90005.$$

QR decomposition gives the following $R_x$ matrix:

$$R_x = \begin{pmatrix} 1.3 & -0.007 & 1.2 & -0.16 \\ 0 & 1.28 & -0.09 & 1.22 \\ 0 & 0 & 0.34 & 0.4 \\ 0 & 0 & 0 & 0.071 \end{pmatrix}$$

which shows that $x_1(t)$ and $x_2(t)$ compose a basis. So the sets of metric data that correspond to Application 2 may be deleted. Applying correlation analysis to the four sets of cumulative sums represented by $\{s_k\}_{k=1}^4$ gives a correlation matrix $$M_s = \begin{pmatrix} 1 & 0.9 & -0.02 & -0.02 \\ 0.9 & 1 & -0.02 & -0.02 \\ -0.02 & -0.02 & 1 & 0.9 \\ -0.02 & -0.02 & 0.9 & 1 \end{pmatrix}$$

with eigenvalues $\lambda_1=1.9615, \lambda_2=1.8735, \lambda_3=0.096, \lambda_4=0.069.$ The numerical rank is 2 and QR decomposition gives the following $R_s$ matrix:

$$R_s = \begin{pmatrix} 1.35 & 1.34 & -0.061 & -0.06 \\ 0 & 0.1 & -0.09 & 1.22 \\ 0 & 0 & 1.4 & 1.4 \\ 0 & 0 & 0 & 0.097 \end{pmatrix}$$

As a result, the sets of metric $x_1(t)$ and $x_3(t)$ compose the basis.

Root-cause Detection and Anomaly Ranking Module

The root-cause detection and anomaly ranking module 106 of FIG. 1 determines a root cause based on monitoring and the event data remaining in the event data container 116 after the alert reduction module 105, such as described in U.S. Pat. No. 8,751,867 B2 filed Oct. 12, 2011 and owned by VMWare, Inc. The root-cause detection and anomaly ranking module 106 may include historical analysis of events with associated probabilistic correlations. Applying information measures between random variables, which embody those events origins of problems may be detected and used to generate real-time recommendations for locations in a hierarchical system. Estimation of system bottlenecks, as well as the risk of "black swan"-type events may also be computed.

It should be noted that the currently disclosed computational methods and systems are directed to real, tangible, physical systems and the methods carried out within physical systems, including client computers and server computers. Those familiar with modern science and technology well appreciate that, in modern computer systems and other processor-controlled devices and systems, the control components are often fully or partially implemented as sequences of computer instructions that are stored in one or more electronic memories and, in many cases, also in one or more mass-storage devices, and which are executed by one or more processors. As a result of their execution, a processor-controlled device or system carries out various operations, generally at many different levels within the device or system, according to control logic implemented in the stored and executed computer instructions. Computer-instruction-implemented control components of modern processor-controlled devices and systems are as tangible and physical as any other component of the system, including power supplies, cooling fans, electronic memories and processors, and other such physical components.

Figure 28:
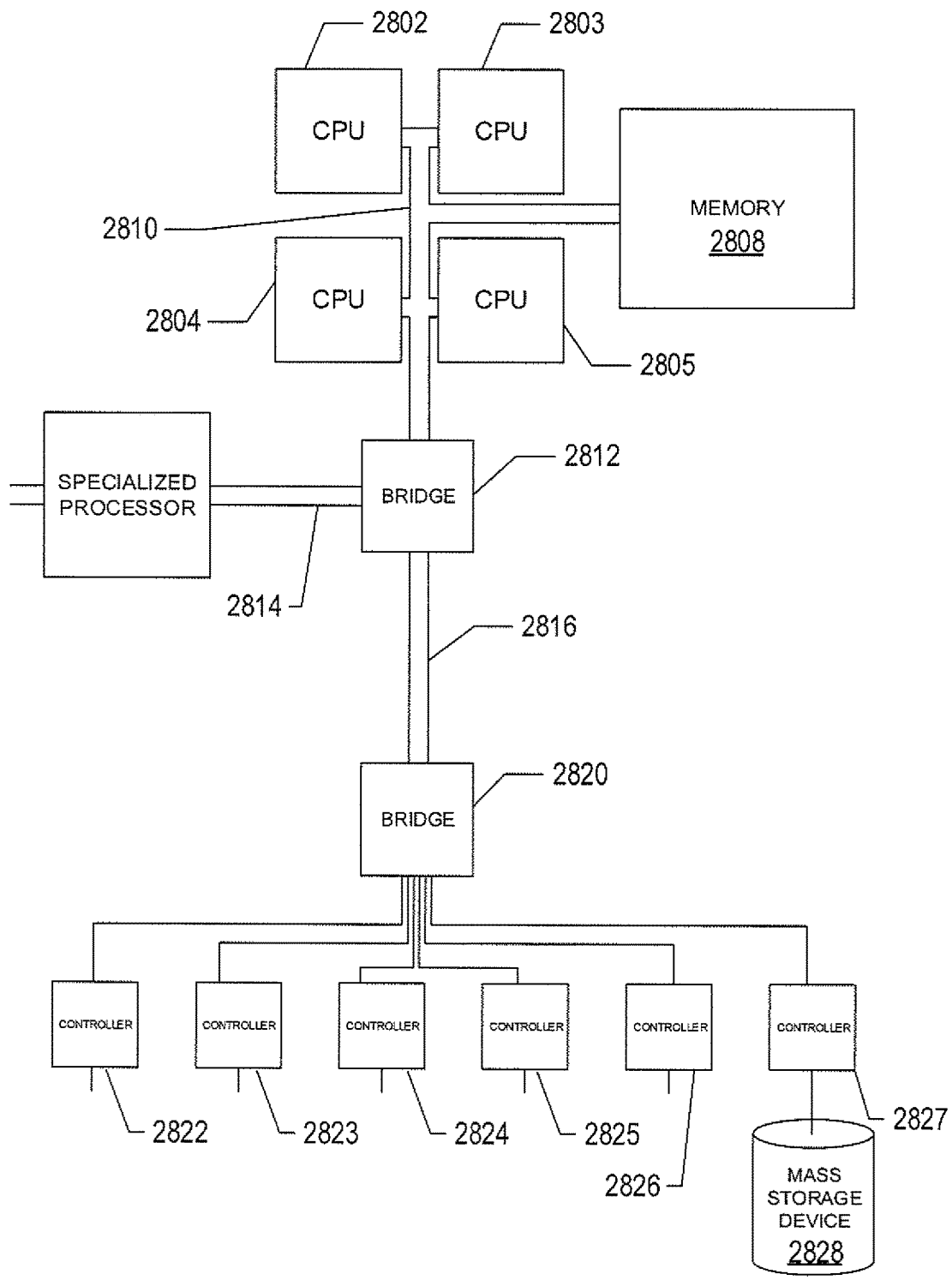
FIG. 28 shows an example of a computer system that executes efficient methods to manage large volumes of metric data.

FIG. 28 shows an example of a computer system that executes efficient metric data management methods and modules of the management methods described above. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 2802-2805, one or more electronic memories 2808 interconnected with the CPUs by a CPU/memory-subsystem bus 2810 or multiple busses, a first bridge 2812 that interconnects the CPU/memory-subsystem bus 2810 with additional busses 2814 and 2816, or other types of high-speed interconnection media, including multiple, high-speed serial interconnects. The busses or serial interconnections, in turn, connect the CPUs and memory with specialized processors, such as a graphics processor 2818, and with one or more additional bridges 2820, which are interconnected with high-speed serial links or with multiple controllers 2822-2827, such as controller 2827, that provide access to various different types of computer-readable media, such as computer-readable medium 2828, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 2828 is a data-storage device, including electronic memory, optical or magnetic disk drive, USB drive, flash memory and other such data-storage devices. The computer-readable medium 2828 can be used to store machine-readable instructions that encode the computational methods described below and can be used to store encoded data, during store operations, and from which encoded data can be retrieved, during read operations, by computer systems, data-storage systems, and peripheral devices.

It is appreciated that the various implementations described herein are intended to enable any person skilled in the art to make or use the present disclosure. Various modifications to these implementations will be readily apparent to those skilled in the art, and the generic principles defined herein may be applied to other implementations without departing from the spirit or scope of the disclosure. For example, any of a variety of different implementations can be obtained by varying any of many different design and development parameters, including programming language, underlying operating system, modular organization, control structures, data structures, and other such design and development parameters. Thus, the present disclosure is not intended to be limited to the implementations described herein but is to be accorded the widest scope consistent with the principles and novel features disclosed herein.

The invention claimed is:

1. A method stored in one or more data-storage devices and executed using one or more processors of a computing environment to manage sets of metric data stored in the one or more data-storage devices, the method comprising:
   computing a correlation matrix of the sets of metric data;
   applying OR-decomposition to the correlation matrix to obtain an R matrix;
   identifying largest diagonal elements of the R matrix, the number of largest diagonal elements equals a numerical rank of the correlation matrix;
   deleting one or more sets of metric data from the one or more data storage devices that do not correspond to the largest number of diagonal elements;
   calculating normalcy bounds for each set of metric data stored in the one or more data-storage devices;
   determining which normalcy bounds of the sets of metric data should be re-calculated based on comparisons with historical characteristics of the sets of metric data;
   determining which normalcy bound violations of the sets of metric data are events worthy of an alert based on a degree of abnormality determined for each normalcy bound violation; and
   deleting sets of metric data from the one or more data storage devices with events that are correlated with events of other sets of metric data.

2. The method of claim 1, further comprising detecting a root cause for each event and ranking each event.

3. The method of claim 1, wherein identifying the largest number of diagonal elements of the R matrix that equals the numerical rank of the correlation matrix further comprises:
   determining eigenvalues of the correlation matrix;
   rank ordering the eigenvalues; and
   determining the numerical rank of the correlation matrix as the largest of the rank ordered eigenvalues with a sum greater than a numerical tolerances.

4. The method of claim 3, further comprising
   computing a standard deviation for each set of metric data;
   deleting each set of metric data with a standard deviation less than a standard deviation threshold.

5. The method of claim 1, wherein in computing the normalcy bounds for each set of metric data further comprises:
   for each set of metric data stored in the one or more data-storage devices,
      performing data quality assurance to identify qualified sets of metric and corrupted sets of metric data;
      deleting the corrupted sets of metric data;
      categorizing each set of metric data; and
      computing normalcy bounds for each set of metric data based on the set of metric data category.

6. The method of claim 1, wherein determining which normalcy bounds of the sets of metric data should be re-calculated based on comparisons with historical characteristics of the sets of metric data further comprises:
   for each set of metric data,
      computing a percentage of metric data are within a region defined by upper and lower thresholds and a current time interval;
      computing area of the region defined by the upper and lower thresholds and the current time interval;
      computing a square area between the metric data within the region and the lower threshold;
      computing a current data-to-threshold alteration degree based on the percentage, the area of the region and the square area; and
      re-calculating normalcy bounds for the set of metric data when a difference between the current data-to-threshold alteration degree and a previous data-to-threshold alteration degree is greater than an alteration degree threshold.

7. The method of claim I, wherein determining normalcy bound events of the sets of metric data based on a degree of abnormality determined for each event further comprises:
   computing estimated upper-threshold and lower-threshold historical degrees of abnormality based on historical time-series data, the historical time-series data represents one of past behavior, performance, and usage of a resource or application and is retrieved from a data-storage device;
   computing estimated current degree of abnormality based on current time-series data, the current time-series data represents one of current behavior, performance, and usage of the resource or application system retrieved from a data-storage device; and
   comparing the estimated current degree of abnormality with one of the estimated upper-threshold and lower-threshold historical degrees of abnormality to determine whether one of the current behavior, performance, and usage of the resource or application system is abnormal.

8. The method of claim 1, wherein deleting sets of metric data from the one or more data storage devices with events that are correlated with events of other sets of metric data further comprises:
   transforming the sets of metric data to sets of anomaly metric data;
   computing a correlation matrix of the sets of the anomaly metric data;
   determining eigenvalues of the correlation matrix;
   determining numerical rank of the correlation matrix based on the eigenvalues;
   decomposing the correlation matrix into a Q matrix and an R matrix;
   identifying a largest number of diagonal elements of the R matrix, the largest number of diagonal elements equal to the numerical rank; and
   deleting sets of metric data that do not correspond to the number of diagonal elements.

9. A system for generating a data structure of metric data generated in a computing environment comprising:
one or more processors;
one or more data-storage devices; and
machine-readable instructions stored in the one or more data-storage devices that when executed using the one or more processors control the system to carry out:
computing a correlation matrix of the sets of metric data;
applying QR-decomposition to the correlation matrix to obtain an R matrix;
identifying largest diagonal elements of the R matrix, the number of largest diagonal elements equals a numerical rank of the correlation matrix;
deleting one or more sets of metric data from the one or more data storage devices that do not correspond to the largest number of diagonal elements;
calculating normalcy bounds for each set of metric data stored in the one or more data-storage devices;
determining which normalcy bounds of the sets of metric data should be re-calculated based on comparisons with historical characteristics of the sets of metric data;
determining which normalcy bound violations of the sets of metric data are events worthy of an alert based on a degree of abnormality determined for each normalcy bound violation; and
deleting sets of metric data from the one or more data storage devices with events that are correlated with events of other sets of metric data.

10. The system of claim 9, further comprising detecting a root cause for each event and ranking each event.

11. The system of claim 9, wherein identifying the largest number of diagonal elements of the R matrix that equals the numerical rank of the correlation matrix further comprises:
determining eigenvalues of the correlation matrix;
rank ordering the eigenvalues; and
determining the numerical rank of the correlation matrix as largest of the ranked ordered eigenvalues with a sum greater than a numerical tolerance.

12. The system of claim 11, further comprising
computing a standard deviation for each set of metric data;
deleting each set of metric data with a standard deviation less than a standard deviation threshold.

13. The system of claim 9, wherein in computing the normalcy bounds for each set of metric data further comprises:
for each set of metric data stored in the one or more data-storage devices,
performing data quality assurance to identify qualified sets of metric and corrupted sets of metric data;
deleting the corrupted sets of metric data;
categorizing each set of metric data; and
computing normalcy bounds for each set of metric data based on the set of metric data category.

14. The system of claim 9, wherein determining which normalcy bounds of the sets of metric data should be re-calculated based on comparisons with historical characteristics of the sets of metric data further comprises:
for each set of metric data,
computing a percentage of metric data are within a region defined by upper and lower thresholds and a current time interval;
computing area of the region defined by the upper and lower thresholds and the current time interval;
computing a square area between the metric data within the region and the lower threshold;
computing a current data-to-threshold alteration degree based on the percentage, the area of the region and the square area; and
re-calculating normalcy bounds for the set of metric data when a difference between the current data-to-threshold alteration degree and a previous data-to-threshold alteration degree is greater than an alteration degree threshold.

15. The system of claim 9, wherein determining normalcy bound events of the sets of metric data based on a degree of abnormality determined for each event further comprises:
computing estimated upper-threshold and lower-threshold historical degrees of abnormality based on historical time-series data, the historical time-series data represents one of past behavior, performance, and usage of a resource or application and is retrieved from a data-storage device;
computing estimated current degree of abnormality based on current time-series data, the current time-series data represents one of current behavior, performance, and usage of the resource or application retrieved from a data-storage device; and
comparing the estimated current degree of abnormality with one of the estimated upper-threshold and lower-threshold historical degrees of abnormality to determine whether one of the current behavior, performance, and usage of the resource or application is abnormal.

16. The system of claim 9, wherein deleting sets of metric data from the one or more data storage devices with events that are correlated with events of other sets of metric data further comprises:
transforming the sets of metric data to sets of anomaly metric data;
computing a correlation matrix of the sets of the anomaly metric data;
determining eigenvalues of the correlation matrix;
determining numerical rank of the correlation matrix based on the eigenvalues;
decomposing the correlation matrix into a Q matrix and an R matrix;
identifying a largest number of diagonal elements of the R matrix, the largest number of diagonal elements equal to the numerical rank; and
deleting sets of metric data that do not correspond to the number of diagonal elements.

17. A non-transitory computer-readable medium encoded with machine-readable instructions that implement a method carried out by one or more processors of a computer system to perform the operations of
computing a correlation matrix of the sets of metric data;
applying OR-decomposition to the correlation matrix to obtain an R matrix;
identifying largest diagonal elements of the R matrix, the number of largest diagonal elements equals a numerical rank of the correlation matrix;
deleting one or more sets of metric data from the one or more data storage devices that do not correspond to the largest number of diagonal elements;
calculating normalcy bounds for each set of metric data stored in the one or more data-storage devices;
determining which normalcy bounds of the sets of metric data should be re-calculated based on comparisons with historical characteristics of the sets of metric data;

determining which normalcy bound violations of the sets of metric data are events worthy of an alert based on a degree of abnormality determined for each normalcy bound violation; and deleting sets of metric data from the one or more data storage devices with events that are correlated with events of other sets of metric data.

18. The medium of claim 17, further comprising detecting a root cause for each event and ranking each event.

19. The medium of claim 17, wherein identifying the largest number of diagonal elements of the R matrix that equals the numerical rank of the correlation matrix further comprises:

determining eigenvalues of the correlation matrix;
rank ordering the eigenvalues; and
determining the numerical rank of the correlation matrix as the largest of the rank ordered eigenvalues with a sum greater than a numerical tolerance.

20. The medium of claim 19, further comprising
computing a standard deviation for each set of metric data;
deleting each set of metric data with a standard deviation less than a standard deviation threshold.

21. The medium of claim 17, wherein in computing the normalcy bounds for each set of metric data further comprises:

for each set of metric data stored in the one or more data-storage devices,
performing data quality assurance to identify qualified sets of metric and corrupted sets of metric data;
deleting the corrupted sets of metric data;
categorizing each set of metric data; and
computing normalcy bounds for each set of metric data based on the set of metric data category.

22. The medium of claim 17, wherein determining which normalcy bounds of the sets of metric data should be re-calculated based on comparisons with historical characteristics of the sets of metric data further comprises:

for each set of metric data,
computing a percentage of metric data are within a region defined by upper and lower thresholds and a current time interval;
computing area of the region defined by the upper and lower thresholds and the current time interval;
computing a square area between the metric data within the region and the lower threshold;
computing a current data-to-threshold alteration degree based on the percentage, the area of the region and the square area; and
re-calculating normalcy bounds for the set of metric data when a difference between the current data-to-threshold alteration degree and a previous data-to-threshold alteration degree is greater than an alteration degree threshold.

23. The medium of claim 17, wherein determining normalcy bound events of the sets of metric data based on a degree of abnormality determined for each event further comprises:

computing estimated upper-threshold and lower-threshold historical degrees of abnormality based on historical time-series data, the historical time-series data represents one of past behavior, performance, and usage of a resource or application and is retrieved from a data-storage device;
computing estimated current degree of abnormality based on current time-series data, the current time-series data represents one of current behavior, performance, and usage of the resource or application retrieved from a data-storage device; and
comparing the estimated current degree of abnormality with one of the estimated upper-threshold and lower-threshold historical degrees of abnormality to determine whether one of the current behavior, performance, and usage of the resource or application is abnormal.

24. The medium of claim 17, wherein deleting sets of metric data from the one or more data storage devices with events that are correlated with events of other sets of metric data further comprises:

transforming the sets of metric data to sets of anomaly metric data;
computing a correlation matrix of the sets of the anomaly metric data;
determining eigenvalues of the correlation matrix;
determining numerical rank of the correlation matrix based on the eigenvalues;
decomposing the correlation matrix into a Q matrix and an R matrix;
identifying a largest number of diagonal elements of the R matrix, the largest number of diagonal elements equal to the numerical rank; and
deleting sets of metric data that do not correspond to the number of diagonal elements.

\* \* \* \* \*